(12) United States Patent
Tsang

(10) Patent No.: US 9,041,771 B2
(45) Date of Patent: May 26, 2015

(54) AUTOMATIC SWITCHING OF A MULTI-MODE DISPLAY FOR DISPLAYING THREE-DIMENSIONAL AND TWO-DIMENSIONAL IMAGES

(75) Inventor: Peter Wai Ming Tsang, Hong Kong (CN)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 388 days.

(21) Appl. No.: 13/155,670

(22) Filed: Jun. 8, 2011

(65) Prior Publication Data

US 2012/0314024 A1    Dec. 13, 2012

(51) Int. Cl.
H04N 13/00 (2006.01)
H04N 13/04 (2006.01)
G09G 3/00 (2006.01)

(52) U.S. Cl.
CPC .......... *H04N 13/0409* (2013.01); *G09G 3/003* (2013.01); *H04N 13/0452* (2013.01); *H04N 13/0497* (2013.01); *G09G 2320/0613* (2013.01)

(58) Field of Classification Search
USPC .................... 348/43, 46, 51; 359/462, 465
See application file for complete search history.

(56) References Cited

U.S. PATENT DOCUMENTS

| | | | |
|---|---|---|---|
| 5,969,850 A | 10/1999 | Harrold et al. | |
| 7,671,889 B2 | 3/2010 | Lipton et al. | |
| 7,826,136 B2 | 11/2010 | Koo et al. | |
| 7,830,579 B2 | 11/2010 | Saishu et al. | |
| 7,834,903 B2 | 11/2010 | Saishu et al. | |
| 7,843,544 B2 | 11/2010 | Kang | |
| 2002/0011969 A1 | 1/2002 | Lipton et al. | |
| 2002/0036825 A1 | 3/2002 | Lipton et al. | |
| 2003/0048354 A1* | 3/2003 | Takemoto et al. | 348/51 |
| 2006/0126177 A1* | 6/2006 | Kim et al. | 359/465 |
| 2006/0139448 A1* | 6/2006 | Ha et al. | 348/51 |
| 2006/0284974 A1 | 12/2006 | Lipton et al. | |
| 2008/0170293 A1* | 7/2008 | Lucente et al. | 359/463 |
| 2008/0231952 A1* | 9/2008 | Kim | 359/465 |
| 2008/0266387 A1* | 10/2008 | Krijn et al. | 348/51 |
| 2011/0148859 A1* | 6/2011 | Huang et al. | 345/419 |
| 2011/0187832 A1* | 8/2011 | Yoshida | 348/46 |

FOREIGN PATENT DOCUMENTS

| | | |
|---|---|---|
| EP | 0540137 B1 | 11/1996 |
| EP | 0833183 B1 | 6/2004 |
| WO | 2007059054 A2 | 5/2007 |
| WO | WO 2010007787 A1 * | 1/2010 |

* cited by examiner

*Primary Examiner* — Christopher S Kelley
*Assistant Examiner* — Zhihan Zhou
(74) *Attorney, Agent, or Firm* — Amin, Turocy & Watson, LLP

(57) ABSTRACT

Systems, methods, and devices that control switching of a multi-mode barrier component for efficiently displaying various types of 2-D content and 3-D content are presented. A barrier control component detects an optical signal in a control region of a display screen that is providing visual content to the barrier component, and identifies the type of visual content, such as 2-D content, 3-D stereoscopic content, or 3-D autostereoscopic content, based at least in part on the optical signal. The barrier control component identifies a specified control signal based at least in part on the identified content type, and transmits the specified control signal to the barrier component via a wireline or wireless connection. The barrier component is controlled to automatically switch to a specified mode, such as 2-D mode, 3-D stereoscopic mode, or 3-D autostereoscopic mode, and employ a specified barrier pattern, in response to the received specified control signal.

28 Claims, 13 Drawing Sheets

AUTOMATIC SWITCHING OF A MULTI-MODE DISPLAY FOR DISPLAYING THREE-DIMENSIONAL AND TWO-DIMENSIONAL IMAGES

TECHNICAL FIELD

The subject disclosure relates generally to image displays, and in particular, to automatic switching of a multi-mode display for displaying three-dimensional and two-dimensional images.

BACKGROUND

Three-dimensional (3-D) visual effects have been around since the 1950s. Conventionally, 3-D visual effects have been realized in part by having the viewers wear glasses having a pair of polarized lens, a pair of chromatically opposite lens, or shutter glass spectacles. More recently, lens-free 3-D visual effects have been realized by using multiple cameras to capture multiple angles of a scene, wherein a monitor, employing a lenticular lens array, reconstructs the multiple views for display to the viewers. Such an arrangement is generally expensive and heavy. Another technique for producing lens-free 3-D visual effects is employing a parallax barrier that can reconstruct multiple views of a 3-D scene for display to viewers. The parallax barrier is relatively lower in cost and lighter in weight, as compared a monitor employing a lenticular lens array.

A 3-D autostereoscopic display based on parallax barrier realizes 3-D visual effects in part by having different pixels carrying different views of a 3-D scene. Such arrangement provides a relatively good 3-D effect, has a relatively low cost, is relatively light weight, and has a relatively lower intensity, than the aforementioned arrangements or techniques. One significant deficiency of this arrangement though is that two-dimensional (2-D) content tends to be blurry when passed through the parallax barrier for display to the viewers. An active parallax barrier has been employed to allow a user to manually switch the barrier on for the display of 3-D content and off for the display of 2-D content, so that the 2-D content is clearly displayed. However, such arrangement is inconvenient, particularly due to the parallax barrier having to be switched on and off manually by a user, and it is generally not useful for videos or slideshows.

Today, there is no way of efficiently controlling the display of 3-D content and 2-D content via the same display without 2-D content appearing to be blurry and/or without a user having to manually switch the parallax barrier on and off. The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary of the disclosed subject matter in order to provide a basic understanding of some aspects described herein. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

The disclosed subject matter relates to systems, methods, and devices that control (e.g., automatically or dynamically in real time) switching of a barrier component (e.g., multiple-display-mode barrier component, such as an active parallax barrier component) to facilitate efficiently displaying various types of two-dimensional (2-D) content and three-dimensional (3-D) content (e.g., 3-D stereoscopic video content, 3-D autostereoscopic video content). In an aspect, a barrier control component can detect a signal, such as an optical signal (e.g., optical signal having a specified optical pattern, optical signal having or providing a specified number of data bits that correspond to a specified data value based at least in part on the respective data values of the respective data bits), in a control region of a display screen component that is providing (e.g., presenting) visual content (e.g., 2-D content, 3-D stereoscopic content, or 3-D autostereoscopic content) to the barrier component, and identify the type of visual content, based at least in part on the detected signal. As an additional or alternative embodiment, the signal transmitted from the display screen component can be an audio signal having a specified frequency (e.g., audio signal that is above or below the audio frequency range of humans (e.g., above 20 kHz or below 20 Hz) that can be detected by the barrier control component, wherein the barrier control component can identify the type of visual content, based at least in part on the detected audio signal (e.g., the frequency of the specified audio signal). The barrier control component can identify a specified control signal based at least in part on the identified content type, and transmit the specified control signal to the barrier component via a wireline or wireless communication connection.

In response to the received specified control signal, the barrier component can be controlled to automatically switch to (or remain in) or select a specified display mode, such as 2-D mode, 3-D stereoscopic mode, or 3-D autostereoscopic mode, of a plurality of available display modes, wherein there can be respective barrier patterns and/or respective barrier pattern modes (e.g., transparent mode, partially opaque 3-D stereoscopic mode, or partially opaque 3-D autostereoscopic mode) that can be utilized in the respective display modes to facilitate desirably presenting 2-D content or 3-D content to a viewer (e.g., presenting 2-D content without blurriness, presenting 3-D stereoscopic content or 3-D autostereoscopic content with the respective 3-D visual characteristics). A respective specified voltage can be applied to the barrier component to facilitate selecting the corresponding barrier pattern mode and/or barrier pattern to utilize in processing the received image to present the processed image in accordance with the selected display mode. For instance, when the video content is normal 2-D content, the barrier pattern mode selected can be a transparent pattern that passes through the received 2-D video content without further processing to facilitate displaying the normal 2-D content without the blurriness that is typically encountered in conventional display systems using an active barrier. When the video content is enhanced 2-D content (e.g., 2-D content comprising a plurality of 2-D images that represent respective portions of a 3-D scene or image), the barrier pattern mode selected in response to the control signal can be one of a plurality of available 3-D partially opaque barrier patterns (e.g., 3-D stereoscopic conversion pattern, 3-D autostereoscopic pattern, etc.) that can receive the enhanced 2-D content and can convert the 2-D content to 3-D content that can be presented to a viewer. The 3-D video content output from and presented by the barrier component can be viewed by the viewer lens free, that is, without the viewer having to wear 3-D glasses (e.g., 3-D glasses with polarized lens, chromatically opposite lens, or shutter glass).

In accordance with an embodiment, the barrier control component can be a stand-alone unit, which can be adhered, attached, or placed in proximity to the barrier component such that the barrier control component is aligned with the control region of the display screen component so that the barrier control component can detect the signals communicated (e.g., transmitted, emitted) by the control region. Alternatively, in accordance with various other embodiments, the barrier control component can be part of the display screen component or barrier component. In accordance with other embodiments, the barrier control component can have a power supply maintained on-board (e.g., battery power supply), an external power supply that is separate from the power supply of the barrier component or display screen component, a can share the same power supply (e.g., external or internal) as the barrier component or display screen component.

In an aspect, the disclosed subject matter can include a system, comprising a barrier control component that is configured to dynamically generate a specified control signal in real time, based at least in part on a particular signal sensed from a control region of a display screen component that presents video content, and transmit the control signal to a barrier component to facilitate control of selection of a barrier pattern and a barrier pattern mode that correspond to the control signal and type of video content being presented, wherein the particular signal is indicative of the barrier pattern and the barrier pattern mode to use to process the video content. The system can further comprise a sensor component that is configured to monitor the control region and sense the particular signal emitted from the control region.

In another aspect, the disclosed subject matter can include a method, comprising the act of detecting a specified signal, which is associated with a video image that is part of video content, in a control region associated with the video image. The method can further include the act of dynamically transmitting a specified control signal, of a plurality of available control signals, in real time to a barrier component to facilitate controlling selecting a specified barrier pattern mode and a specified barrier pattern most suitable for processing the video image from a plurality of available barrier pattern modes and a plurality of available barrier patterns, wherein the specified control signal is selected based at least in part on information contained in the specified signal.

In still another aspect, the disclosed subject matter can include a system, comprising means for means for sensing a specified signal, which is associated with a video image that is part of video content, in a control region associated with the video image. The system can further comprise means for means for dynamically transmitting a specified control signal, of a plurality of available control signals, in real time to a barrier component to facilitate controlling selecting a specified barrier pattern mode and a specified barrier pattern most suitable for processing the video image from a plurality of available barrier pattern modes and a plurality of available barrier patterns, wherein the specified control signal is selected based at least in part on information contained in the specified signal.

The following description and the annexed drawings set forth in detail certain illustrative aspects of the disclosed subject matter. These aspects are indicative, however, of but a few of the various ways in which the principles of the disclosed subject matter can or may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
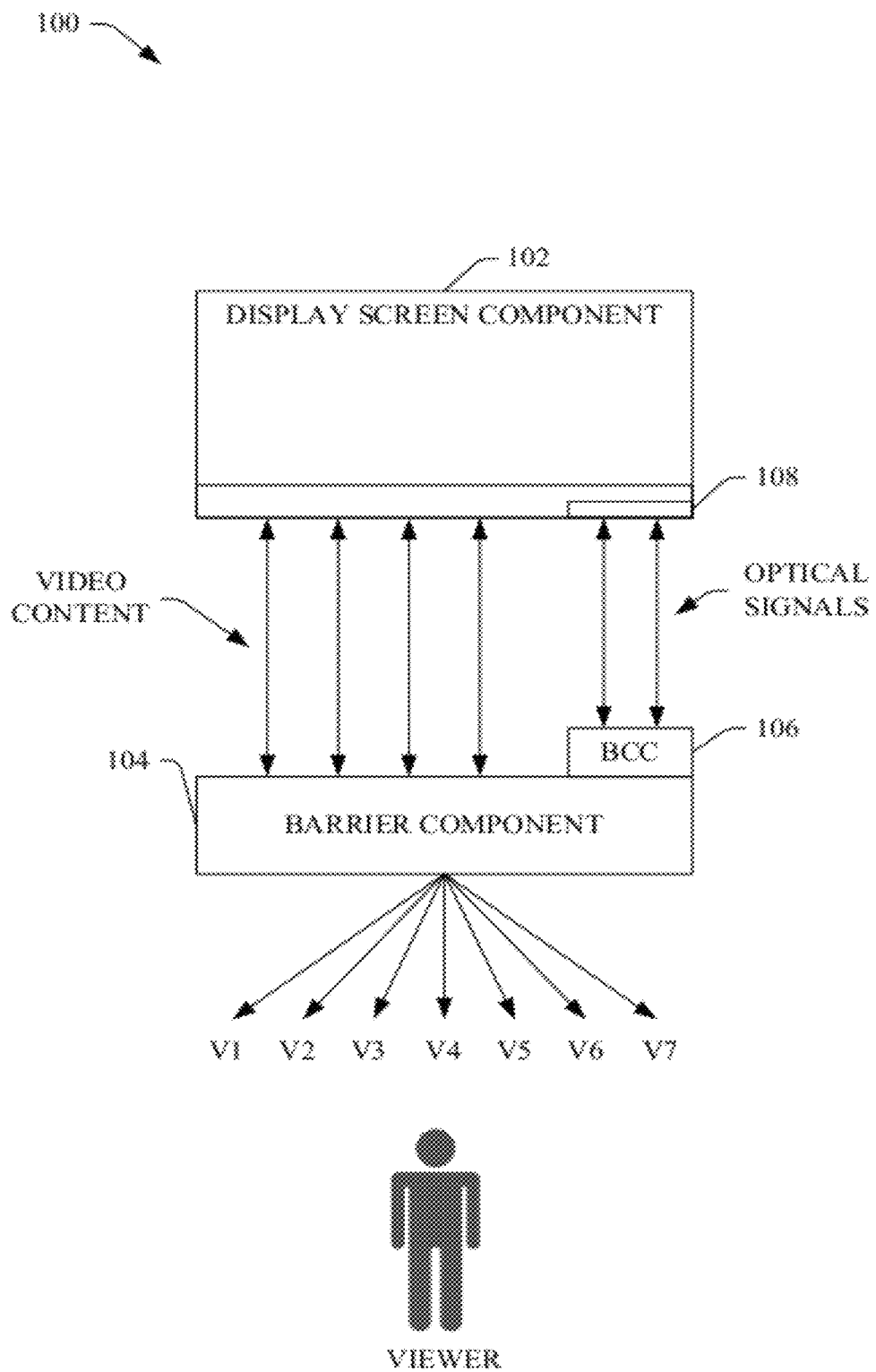
FIG. 1 illustrates a block diagram of an example system that can desirably control (e.g., automatically or dynamically) switching or selection of a multi-dimensional display mode of a barrier component (e.g., multi-mode barrier component) to facilitate presentation of a visual image(s) in a desired multi-dimensional display mode, in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

Conventional video processing of video content to produce three-dimensional (3-D) visual effects has reached the point where 3-D images can be viewed by viewers without the need for 3-D glasses to be worn by the viewers. For example, a 3-D autostereoscopic display based on parallax barrier realizes 3-D visual effects in part by having different pixels carrying different views of a 3-D scene. However, one significant deficiency of using such a parallax barrier is that, when two-dimensional (2-D) content is passed through the parallax barrier, the 2-D content tends to be blurry for display to the viewers. An active parallax barrier has been employed to allow a user to manually switch the barrier on for the display of 3-D content and off for the display of 2-D content, so that the 2-D content is clearly displayed. However, such arrangement is inconvenient, particularly due to the parallax barrier having to be switched on and off manually by a user, and further, it is generally not useful for videos or slideshows. Today, there is no way of efficiently and effectively controlling the display of 3-D content and 2-D content via the same display without 2-D content appearing to be blurry and/or without a user having to manually switch the parallax barrier on and off.

The disclosed subject matter relates to systems, methods, and devices that control (e.g., automatically or dynamically in real time) switching of a barrier component (e.g., active parallax barrier component) to facilitate efficiently displaying various types of 2-D content and 3-D content. In an aspect, a barrier control component can detect a signal, such as an optical signal (e.g., optical signal having a specified optical pattern, optical signal having or providing a specified number of data bits that correspond to a specified data value based at least in part on the respective data values of the respective data bits), in a control region of a display screen component that is providing (e.g., presenting) visual content (e.g., 2-D content, 3-D stereoscopic content, or 3-D autostereoscopic content) to the barrier component, and identify the type of visual content, based at least in part on the detected signal. As an additional or alternative embodiment, the signal transmitted from the display screen component can be an audio signal having a specified frequency (e.g., audio signal that is above or below the audio frequency range of humans (e.g., above 20 kHz or below 20 Hz)) that can be detected by the barrier control component, wherein the barrier control component can identify the type of visual content, based at least in part on the detected audio signal (e.g., the frequency of the specified audio signal). The barrier control component can identify a specified control signal based at least in part on the identified content type, and transmit the specified control signal to the barrier component via a wireline or wireless communication connection. In response to the received specified control signal, the barrier component can be controlled to automatically switch to (or remain in) or select a specified display mode, such as 2-D mode, 3-D stereoscopic mode, or 3-D autostereoscopic mode, wherein there can be respective barrier pattern modes and/or barrier patterns that can be utilized in the respective display modes to facilitate desirably presenting 2-D content or 3-D content to a viewer (e.g., presenting 2-D content without blurriness, presenting 3-D stereoscopic content or 3-D autostereoscopic content with the respective 3-D visual characteristics). In an aspect, a respective specified voltage can be applied to the barrier component to facilitate selecting the corresponding barrier pattern mode and/or barrier pattern to utilize in processing the received image to present the processed image in accordance with the selected display mode. For instance, when the video content is normal 2-D content, the barrier pattern mode selected can be a transparent barrier pattern that passes through the received 2-D video content without further processing to facilitate displaying the normal 2-D content without the blurriness that is otherwise typically encountered in conventional display systems using an active barrier. When the video content is enhanced 2-D content (e.g., 2-D content comprising a plurality of 2-D images that represent respective portions of a 3-D scene or image), the barrier pattern mode and/or barrier pattern selected in response to the control signal can be one of a plurality of partially opaque 3-D barrier patterns (e.g., 3-D stereoscopic barrier pattern, 3-D autostereoscopic barrier pattern, etc.) that can receive the enhanced 2-D content and can convert the enhanced 2-D content to produce video content that reconstructs the 3-D scene (also referred to herein as the 3-D object scene), and that produced video content can be presented to a viewer.

In accordance with an embodiment, the barrier control component can be a stand-alone unit, which can be adhered, attached, or placed in proximity to the barrier component such that the sensor component of the barrier control component faces and is aligned with the control region of the display screen component so that the barrier control component can detect the signals communicated (e.g., transmitted, emitted) by the control region. Alternatively, in accordance with various other embodiments, the barrier control component can be part of the display screen component or the barrier component. In accordance with other embodiments, the barrier control component can have a power supply maintained on-board (e.g., battery power supply), an external power supply that is separate from the power supply of the barrier component or display screen component, a can share the same power supply (e.g., external or internal) as the barrier component or display screen component.

Turning to the figures, FIG. 1 illustrates a block diagram of an example system 100 that can desirably control (e.g., automatically or dynamically) switching or selection of a multi-dimensional display mode of a barrier component (e.g., multi-mode barrier component) to facilitate presentation of a visual image(s) in a desired multi-dimensional display mode, in accordance with various aspects and embodiments of the disclosed subject matter. In an aspect, the system 100 can comprise a display screen component 102 that can display or present video images (e.g., movie, television show, video, photograph, etc.) and/or audio to a viewer perceiving or observing the display screen component 102. In accordance with various embodiments, the display screen component 102 can be, or can be part of, a television, computer monitor, a video display device (e.g., digital video disc (DVD) player, digital video player or recorder, etc.), a mobile phone (e.g., cellular phone), electronic book, netbook, digital photo frame, electronic gaming device, or another electronic device (e.g., electronic toy) capable of displaying visual images. The display screen of the display screen component 102 can be a liquid crystal display (LCD), a light emitting diode (LED) display, a combination LCD-LED display, a plasma display (e.g., plasma display panel (PDP)), a digital light processing (DLP) display, a cathode ray tube (CRT) display, or other type of display screen that can display visual images. The display screen component 102 can present normal 2-D content, or enhanced 2-D content (e.g., 2-D content comprising a plurality of 2-D images of respective views of a 3-D scene or image) that can be further processed or enhanced to be converted or presented as 3-D content (e.g., video content comprising a reconstructed 3-D scene) of a specified type (e.g., stereoscopic 3-D content, autostereoscopic 3-D content, etc.) by a barrier component 104, as more fully disclosed herein. With regard to 3-D content, for a particular visual image of enhanced 2-D content, there can be 2 or more 2-D views (e.g., 2, 3, 4, 5, 6, 7, 8, 9, or more views) that together make up the 3-D image scene. The multiple 2-D images of the 3-D image scene can be rendered into a single 2-D image (e.g., single enhanced 2-D image). When the enhanced 2-D content is presented by the display screen component 102, the barrier component 104 can process the enhanced 2-D content for presentation as a 3-D image (e.g., 3-D object image), wherein the enhanced 2-D content can be passed through a corresponding barrier pattern (in a corresponding barrier pattern mode) that can direct the respective illuminating pixels associated with respective views of the multiple views, which make up the 3-D image scene, to proceed along a direction corresponding to the view of the 3-D image scene such view represents.

In an aspect, the display screen component 102 can be associated with (e.g., in proximity to and presenting video content to) the barrier component 104 that can process video content (e.g., video, digital photographs, etc.), such as normal 2-D content or enhanced 2-D content (e.g., which can be processed or converted to 3-D content of a specified type) to present the normal 2-D content or present the 3-D content in a specified 3-D content form, in accordance with a specified display mode of a plurality of available display modes of the barrier component 104. The barrier component 104 can be a multi-mode active barrier component (e.g., comprising an active parallax barrier) or another type of multi-mode barrier component that can include one or more 2-D display modes for processing and/or presenting normal 2-D content, and one or more 3-D display modes for processing and/or presenting 3-D content based at least in part on received enhanced 2-D content. In an embodiment, the barrier component 104 can be or can comprise a liquid crystal polarizer (LCP) or prism LCP (PLCP) that can employ, at various times, a specified barrier pattern, of a plurality of available barrier patterns, in a specified barrier pattern mode, based at least in part on the type of video content being presented to the viewer. The 3-D video content output from and presented by the barrier component 104 can be viewed by the viewer lens free, that is, without the viewer having to wear 3-D glasses (e.g., 3-D glasses with polarized lens, chromatically opposite lens, or shutter glass).

In accordance with various aspects and embodiments, to facilitate desired presentation of video content, whether 2-D content or 3-D content, the system 100 can include a barrier control component (BCC) 106 that can control (e.g., automatically or dynamically in real time) switching of the barrier component 104, as more fully disclosed herein. The real time control can be on the order of seconds (e.g., performing selection or switching within 1 second, 2 seconds, 3 seconds, . . . ) or milliseconds (ms) (e.g., performing selection or switching within 1 ms, 2 ms, 3 ms, . . . ), for example. In an aspect, the display screen component 102 can comprise a control region 108 (also referred to as BCC 108), of a specified size (e.g., spatial size, specified number of pixels), that can be formed in a portion of the display screen. The display screen component 102 can generate, embed, or present a specified signal, such as a specified optical signal (e.g., optical signal having a specified optical (e.g., light) pattern, optical signal having or providing a specified number of data bits that correspond to a specified data value based at least in part on the respective data values of the respective data bits, etc.), via the control region 108. For instance, the video content already can contain (e.g., embed) the specified signal in the control region 108, or the display screen component 102 can analyze the video content to identify the type of video content and can generate the specified signal and embed it in the control region 108.

The specified signal can be one of a plurality of available signals, wherein respective signals can correspond to respective types of multi-dimensional video content and/or respective types of display modes and/or respective types of barrier pattern modes or barrier patterns. For example, there can be a first signal that can correspond (e.g., be mapped to) normal 2-D content, a second signal that can correspond to a first type of 3-D content (e.g., 3-D stereoscopic content, wherein the presented video content can be one type of enhanced 2-D content that can be processed or converted to produce the 3-D stereoscopic content), or a third signal that can correspond to a disparate type of 3-D content (e.g., 3-D autostereoscopic content, wherein the presented video content can be a disparate type of enhanced 2-D content that can be processed or converted to produce the 3-D autostereoscopic content), although it is to be appreciated that there can be other types of 2-D content or 3-D content as well as other types of signals.

In accordance with various aspects, a specified signal can be included or embedded in the control region 108 for each visual image of a piece of video content, one visual image of a plurality of visual images of a 3-D image or scene, or can be included or embedded in the control region 108 of only specified visual images of the video content, wherein, for example, a specified signal can be included or embedded in the control region 108 of a visual image, or in the respective control region 108 of a specified number of visual images, when there is an initial selection or a change in selection of a display mode of the available multiple display modes, while the video content is being presented. For instance, a specified signal can be included or embedded in the control region 108 of a specified number of visual images of video content so that if, for any reason, the barrier control component 106 does not detect the specified signal in one visual image, the barrier control component 106 can detect the specified signal in one or more of the other visual images that contain the specified signal. Additionally or alternatively, the specified signal can be presented periodically in the control region 108 of certain of the visual images of the video content. In another aspect, when a specified signal of a plurality of available signals is being embedded in a control region of a visual image(s) to facilitate selecting a corresponding display mode of the barrier component 106, the specified signal can be embedded in the control region 108 of one or more visual images that are at or near (e.g., immediately prior) to the time the desired display mode selection is desired to occur, such that the selection or switching to the desired display mode can occur at, or at least substantially near, the time the visual image(s), for which the desired display mode is desired, is to be presented as an output from the barrier component 106 to the viewer. Such timing of embedding the specified signal in the control region 108 of a visual image can account for a delay (if any) between the time the specified signal is detected and the time the display mode is selected.

When the specified signal is only embedded in certain video images of video content, upon detection of the specified signal, the barrier control component 106 can identify and select the corresponding specified control signal, which can be transmitted to the barrier component 104. The barrier control component 106 can continue to maintain transmission of the same specified signal, or can discontinue transmission of the specified signal (e.g., in response to a communication from the barrier component 104 indicating that the desired display mode has been selected and implemented) which can reduce power consumption by the barrier control component 106, and the barrier component 104 can continue to operate in that desired display mode regardless of whether it continues to receive the control signal from the barrier control component, until the barrier component 104 receives a different control signal from the barrier control component 106. If a different control signal is received, the barrier component 104 can switch to a different display mode in accordance with the different control signal.

As an additional or alternative embodiment, the specified signal transmitted from the display screen component 102 can be an audio signal having a specified frequency (e.g., audio signal that is above or below the audio frequency range of humans (e.g., above 20 kHz or below 20 Hz)) that can be detected by the barrier control component 106, wherein the barrier control component 106 can identify the type of visual content, based at least in part on the detected audio signal (e.g., the frequency of the specified audio signal).

In another aspect, the barrier control component 106 can be positioned in relation to the control mode 108 so that a sensor component (e.g., sensing means) of the barrier control component 108 can be facing and aligned with the control region 108. The barrier control component 106, utilizing the sensor component, can monitor or scan information, such as the specified signal, being transmitted or emitted from the control region 108 of the video content presented by the display screen component 102. During the monitoring or scanning, the barrier control component 106 can detect (e.g., automatically or dynamically in real time) the specified signal presented (e.g., transmitted or emitted) from the control region 108 of the display screen component 102, can analyze and identify the specified signal as being one particular signal of the plurality of available types of signals, based at least in part on the information in the detected signal. The barrier control component 106 can identify the type of visual content and/or the desired display mode (and/or desired barrier pattern mode and/or barrier pattern) for such video content, based at least in part on the type (e.g., pattern type) or data value of the identified signal. For example, the respective signals (e.g., optical signals) can be mapped to corresponding types of visual content and/or corresponding display modes (and/or desired barrier pattern mode and/or barrier pattern), and the barrier control component 106 can analyze the mapping associated with a particular received signal to identify the type of visual content or desired display mode (and/or desired barrier pattern mode and/or barrier pattern) for such content.

In another aspect, the barrier control component 106 can identify and select (e.g., automatically or dynamically, in real time) a specified control signal of a plurality of types of control signals, based at least in part on the identified video content type or signal type. For example, the mapping of respective signals (e.g., received optical signals from the control region) to corresponding types of visual content and/or corresponding display modes (and/or desired barrier pattern mode and/or barrier pattern) can further include mapping to corresponding control signals respectively associated with the corresponding types of visual content and/or corresponding display modes. In still another aspect, the barrier control component 106 can transmit the specified control signal to the barrier component 104 via a wireline or wireless communication connection between the barrier control component 106 and barrier component 104.

In response to the received specified control signal, the barrier component 104 can be controlled (e.g., automatically or dynamically, in real time) to automatically switch to (or remain in) or select a specified display mode, such as 2-D mode, 3-D stereoscopic mode, or 3-D autostereoscopic mode, wherein there can be corresponding barrier pattern modes and/or barrier patterns that can be utilized in the respective display modes to facilitate desirably presenting 2-D content or 3-D content to a viewer (e.g., presenting 2-D content without blurriness, presenting 3-D stereoscopic content or 3-D autostereoscopic content with the respective 3-D visual characteristics). To select or apply a particular barrier pattern to video content, a specified voltage, which corresponds to the selected display mode and particular barrier pattern mode and/or barrier pattern, can be applied by the barrier component 104 to one or more electrodes or other electronic components that facilitate selection of the particular barrier pattern mode and/or barrier pattern. With the desired barrier pattern mode and/or barrier pattern selected and applied, the barrier component 104 can receive the video content (e.g., standard 2-D content, enhanced 2-D content for conversion to 3-D content) and can pass or transmit the received video content through the selected barrier pattern in the selected barrier pattern mode.

It is to be appreciated and understood that a barrier pattern typically can have more than one mode, such as, for example, a transparent mode and a partially opaque mode, wherein the transparent mode can be employed to have the barrier pattern be transparent so that it can pass normal 2-D video content through without affecting the 2-D video content to preserve visual quality, and the partially opaque mode can be one of a number different barrier pattern types, as more fully disclosed herein, and enhanced 2-D video content can be passed through the partially opaque barrier pattern to convert the enhanced 2-D video content into 3-D video content (e.g., video content comprising a reconstructed 3-D scene). Further, there can be a plurality of different barrier patterns that can be utilized by the barrier component 104, wherein for example, the different barrier patterns can employ respective partially opaque barrier patterns that can be used to process respective types of enhanced 2-D content when in a specified partially opaque mode (in addition to being able to pass though 2-D content when in transparent barrier pattern mode).

If the video content is standard 2-D content, the selected barrier pattern mode can be a transparent barrier pattern mode and the 2-D content can be passed through such the selected barrier pattern in such mode without the 2-D content being affected by such barrier pattern. The 2-D content can be presented as an output by the barrier component 104 for viewing by a viewer. If, for example, the video content is enhanced 2-D content that can be converted to 3-D stereoscopic content, the selected barrier pattern mode (and selected barrier pattern) can be a stereoscopic-type barrier pattern mode, wherein the barrier pattern can comprise or be in the form of repeated columns of regularly (e.g., evenly) spaced vertical strips to facilitate display of the two respective views that make up the 3-D image to the viewer; and the enhanced 2-D content (e.g., stereoscopically enhanced 2-D content) can be passed through the stereoscopic-type barrier pattern to convert the enhanced 2-D content to 3-D stereoscopic content, wherein the barrier component 104 using the stereoscopic-type barrier pattern directs each illuminating pixel of the visual image to proceed along a direction that corresponds to the view of the 3-D image scene such view represents. In an aspect, the 3-D stereoscopic content, which can comprise 2 views (e.g., two 2-D views) that make up the 3-D image, can be presented as an output by the barrier component 104 for viewing by a viewer.

As another example, if the video content is enhanced 2-D content (e.g., autostereoscopically enhanced 2-D content) that can be converted to 3-D autostereoscopic content, the selected barrier pattern mode (and selected barrier pattern) can be an autostereoscopic-type barrier pattern mode, wherein the barrier pattern can comprise or be in the form of a plurality of slanted opaque strips which can be repetitive and/or regularly spaced (e.g., a repetitive sequence of regularly (e.g., evenly) spaced slanted strips) to facilitate display of the multiple (e.g., 3, 4, 5, 6, 7, 8, 9, or more) views that make up the 3-D image to the viewer; and the enhanced 2-D content can be passed through the autostereoscopic-type barrier pattern to convert the enhanced 2-D content to 3-D autostereoscopic content, wherein the barrier component 104 using the autostereoscopic-type barrier pattern directs each illuminating pixel of the visual image to proceed along a direction that corresponds to the respective view of the 3-D image scene such view represents. The 3-D auto stereoscopic content, which can comprise a specified number of respective views (e.g., respective 2-D views) that make up the 3-D image, can be presented as an output (e.g., views 1 through 7 (V1 through V7) as depicted in FIG. 1) by the barrier component 104 for viewing by a viewer. It is to be appreciated and understood that the above example barrier patterns are just a few of the various types of barrier patterns that can be employed in accordance with the disclosed subject matter, and all such various barrier pattern types are contemplated for use with the disclosed subject matter.

In accordance with an embodiment, the barrier control component 106 can be a stand-alone unit (as depicted), which can be adhered, attached, or placed in proximity to (as depicted) the barrier component 104 such that the barrier control component 106 is aligned with the control region 108 of the display screen component 102, and associated visual images, so that the barrier control component 106 can detect the signals communicated (e.g., transmitted, emitted) by or from the control region 108. Alternatively, in accordance with various other embodiments, the barrier control component 106 can be part of the display screen component 102 or barrier component 104.

In accordance with other embodiments, the barrier control component 106 can have a power supply maintained on-board (e.g., battery power supply), an external power supply that is separate from the power supply of the barrier component 104 or display screen component 102, or can share the same power supply (e.g., external or internal) as the barrier component 104 or display screen component 102.

The disclosed subject matter, by automatically and dynamically controlling the display mode of and barrier pattern selection by the barrier component 104 in real time, can more efficiently and desirably display 2-D content and 3-D content, without the 2-D content being degraded by a barrier pattern, without requiring manual switching between display modes or barrier patterns when the type of video content changes, and without requiring modification (or at least without requiring significant modification) of the display screen component or barrier component, in contrast to conventional display systems. The disclosed subject matter also is relatively inexpensive and thus is a cost effective solution for processing and presenting 2-D and 3-D content. Further, the barrier control component 106 can consume a relatively low amount of power during operation and thus is a cost effective and power efficient solution for processing and presenting 2-D and 3-D content.

Figure 2:
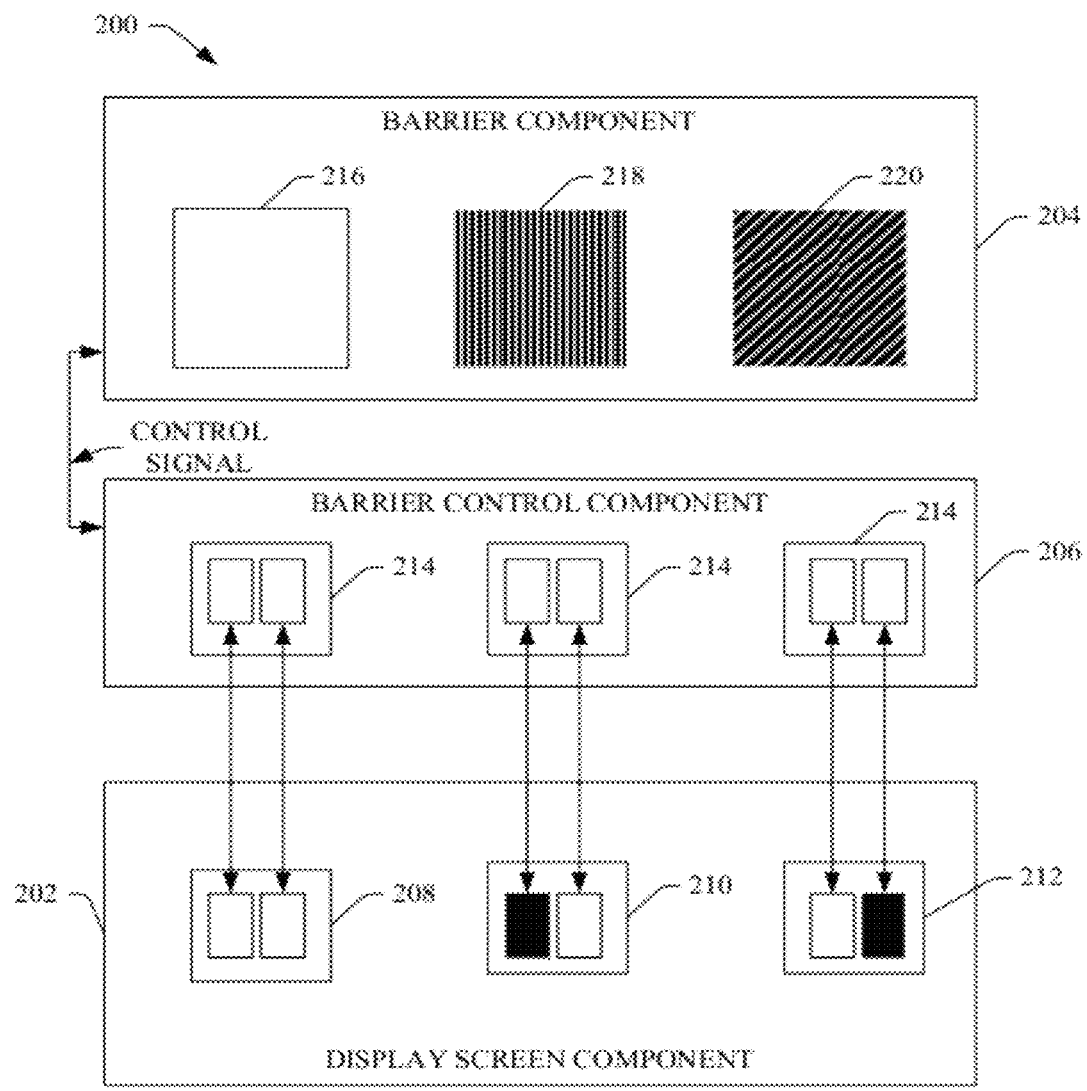
FIG. 2 depicts a diagram of an example system that can employ respective optical signals to facilitate controlling selection of respective barrier patterns to facilitate desirable display of multi-dimensional video content in accordance with various aspects and embodiments.

FIG. 2 depicts a diagram of an example system 200 that can employ respective optical signals to facilitate controlling selection of respective barrier patterns to facilitate desirable display of multi-dimensional video content in accordance with various aspects and embodiments. In an aspect, the system 200 can include a display screen component 202, barrier component 204, and barrier control component 206 that each can be the same as or similar to, and/or can comprise the same or similar functionality as, respective components (e.g., respectively named components), as more fully disclosed herein.

In an aspect, the display screen component 202 can include a display screen that comprises a control region (e.g., 108), wherein an optical signal (e.g., light signal) of a plurality of available optical signals can be presented (e.g., transmitted, emitted). The plurality of available optical signals can include, for example, a first optical signal 208 (e.g., transparent or 2-D-indicator optical signal) that can comprise a first light pattern, wherein the first light pattern (e.g., comprising 2 pixels) can comprise 2 bits of data, and wherein the 2 pixels can be respectively set (e.g., turned on to emit light, turned off so no light is emitted; set to a first wavelength to be a first indicator, set to a second wavelength to be a second indicator; etc.) to form the first light pattern resulting in the 2 bits of data being set to a specified data value (e.g., 00 (or 11)) to indicate that video content is 2-D content; a second optical signal 210 (e.g., 3-D stereoscopic-indicator optical signal) that can comprise a second light pattern, wherein the second light pattern (e.g., comprising 2 pixels) can comprise 2 bits of data, and wherein the 2 pixels can be respectively set to form the second light pattern thereby resulting in the 2 bits of data being set to a different specified data value (e.g., 10) to indicate that video content is 3-D stereoscopic content; and a third optical signal 212 (e.g., 3-D autostereoscopic-indicator optical signal) that can comprise a third light pattern, wherein the third light pattern (e.g., comprising 2 pixels) can be respectively set to form the third light pattern thereby resulting in the 2 bits of data being set to still another specified data value (e.g., 01) to indicate that video content is 3-D autostereoscopic content. It is to be appreciated and understood that, while 2 pixels and 2 bits of data are being employed in this example system 200, the disclosed subject matter is not so limited, as, in accordance with other embodiments, the control region also can employ less than 2 pixels or 2 bits of data (e.g., use 1 pixel or 1 bit of data, for instance, when there are only two barrier pattern modes, such as a transparent barrier pattern mode for 2-D content and a 3-D type barrier pattern mode for 3-D content, available) or more than 2 pixels or 2 bits of data (e.g., use 3 pixels or 3 bits of data, for example, when there is a total number of available barrier pattern modes that is greater than 4 and less than 9).

The control region can be a light producing means or light emitting means that can transmit or output optical signals comprising light, which can be in the visible range of humans or can be outside the visible range of humans. The control region can produce and present different optical signals comprising different light patterns to facilitate selection of a barrier pattern mode (e.g., transparent mode, a first-type of partially opaque mode, a second-type of partially opaque mode, etc.) to use to process video content, based at least in part on the type of video content being presented by the display screen component 202.

In another aspect, the barrier control component 206 can comprise a sensor component 214 that can include a sensor array (e.g., comprising light-sensing sensors), which can be aligned with, and can monitor or scan, the control region of the display screen component 202. The sensor component 214, utilizing the sensor array, can detect the optical signals (e.g., 208, 210, 212) being presented by the control region of the display screen component 202. The barrier control component 206 can analyze a detected optical signal and identify the type of optical signal, type of video content, type of barrier pattern mode, type of barrier pattern, and/or type of display mode associated with the detected optical signal to facilitate automatically and dynamically controlling switching or selection of the display mode and corresponding barrier pattern in real time, as more fully disclosed herein. The sensor component 214 can comprise, for example, a sensor array comprising a specified number of sensors that can correspond to the number of pixels or bits of optical data (e.g., a sensor for each bit of data) that can be presented by the control region of the display screen component 202.

In still another aspect, the barrier component 204 can comprise a specified number of barrier pattern modes that can respectively correspond to the available display modes of the barrier component 204. The specified number of barrier pattern modes can include, for example, a first barrier pattern mode 216, a second barrier pattern mode 218, and a third barrier pattern mode 220, wherein the first barrier pattern mode 216 can be associated with a transparent barrier pattern that can pass through video content (e.g., 2-D content) without affecting or altering the video content, the second barrier pattern mode 218 can be associated with a stereoscopic-type barrier pattern that can process input video content (e.g., enhanced 2-D video content comprising stereoscopic images) to generate a specified number (e.g., 2) of 3-D stereoscopic images of a 3-D image scene as an output, as more fully disclosed herein, and the third barrier pattern mode 220 can be associated with an autostereoscopic-type barrier pattern that can process input video content (e.g., enhanced 2-D video content comprising autostereoscopic images) to generate a specified number of 3-D autostereoscopic images of a 3-D image scene as an output, as more fully disclosed herein.

Figure 3:
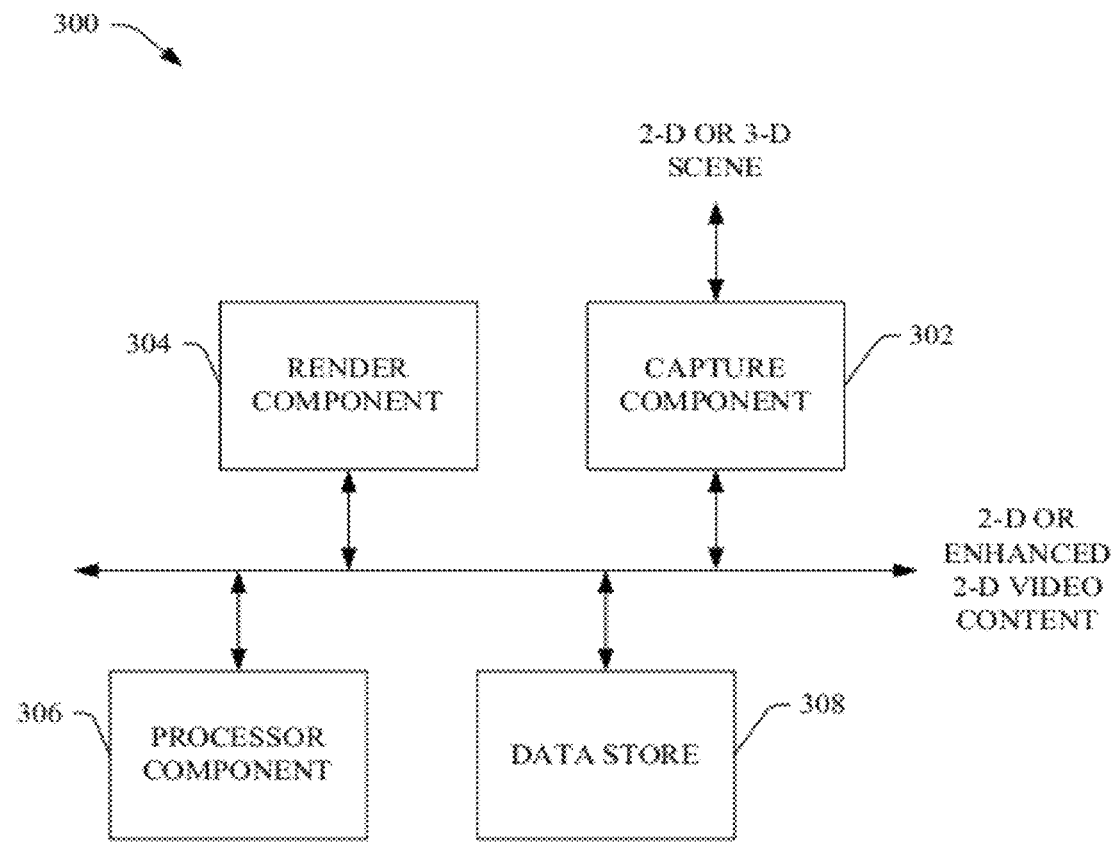
FIG. 3 illustrates a diagram of an example system that can capture and process a real scene as a 3-D scene in accordance with various aspects and embodiments of the disclosed subject matter.
Figure 4:
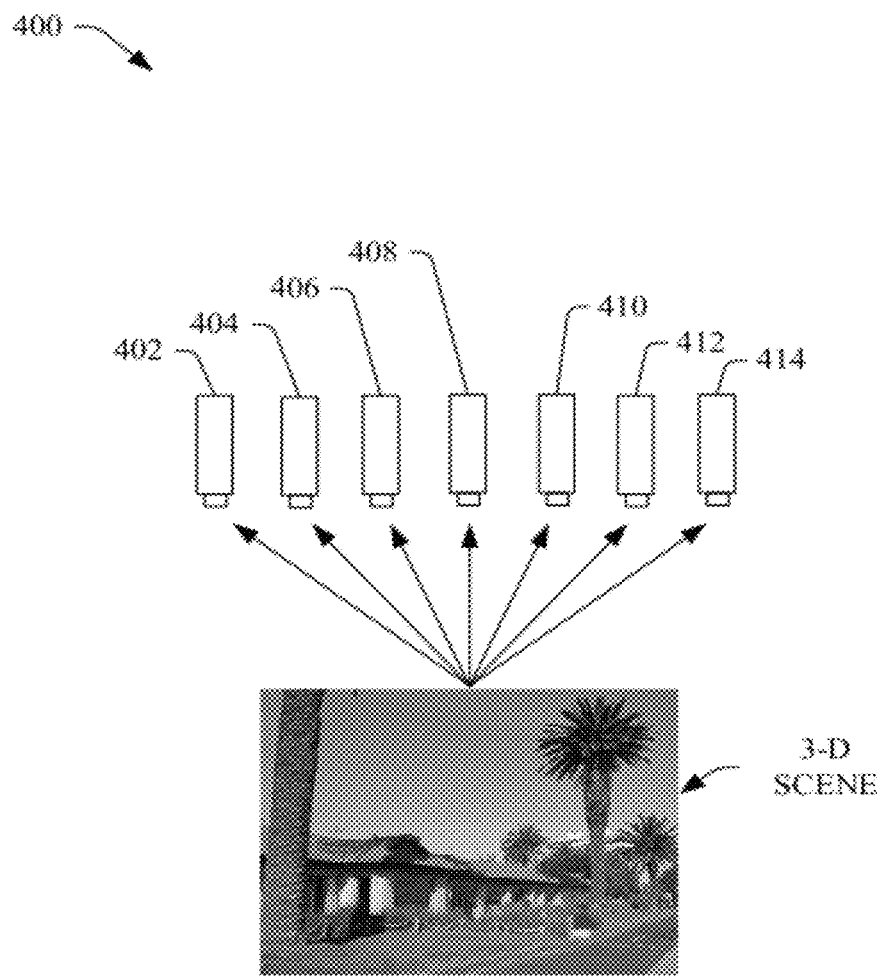
FIG. 4 depicts a diagram of an example system for capturing a real 3-D scene, the system 400 can comprise a plurality of scene capture devices in accordance with various aspects of the disclosed subject matter.

FIG. 3 illustrates a diagram of an example system 300 that can capture and process a real scene as a 3-D scene in accordance with various aspects and embodiments of the disclosed subject matter. The system 300 can include a capture component 302 that can capture or generate (e.g., computer generate or simulate) multiple 2-D views of a real or synthetic 3-D scene image for each image of a 3-D scene. Turning briefly to FIG. 4 (along with FIG. 3), which depicts an example system 400 for capturing a real 3-D scene, the system 400 can comprise a plurality of scene capture devices (e.g., video cameras), such as scene capture devices 402, 404, 406, 408, 410, 412, and 414. The respective scene capture devices 402 through 414 can be placed in different positions in relation to the real 3-D scene to provide different visual perspectives of the 3-D scene from different angles. The various different positions of the respective scene capture devices 402 through 414 can correspond to the barrier pattern mode (e.g., associated with an autostereoscopic barrier pattern) to be employed when reconstructing and presenting the 3-D scene to the viewer, wherein a corresponding barrier pattern can be structured (e.g., partially opaque and having a defined pattern, as more fully disclosed herein) so that it can receive enhanced video information relating to an image of the 3-D scene (e.g., enhanced 2-D content of an image of the 3-D scene) based at least in part on the respective subsets of visual information associated with the real 3-D scene, can process the enhanced video information to identify the respective 2-D images captured by the respective scene capture devices 402 through 414, and can direct the respective 2-D images to proceed in respective directions that correspond to the respective positions of the respective scene capture devices 402 through 414 when the respective scene capture devices 402 through 414 were capturing the real 3-D scene from their respective perspectives, as more fully disclosed herein, so that the reconstructed real 3-D scene can be the same or substantially similar to the real 3-D scene as captured, when the reconstructed real 3-D scene is presented by the barrier component to the viewer.

In another aspect, the capture component 302 can be employed to generate or synthesize a 3-D scene, wherein the capture component 302 can generate respective subsets of visual information from a plurality of respective positions in relation to the 3-D scene being synthesized to provide different perspectives of the 3-D scene. The various different positions, associated with the respective subsets of visual information relating to the synthesized 3-D scene, can correspond to the barrier pattern mode (e.g., associated with an autostereoscopic barrier pattern) to be employed when reconstructing and presenting the synthesized 3-D scene to the viewer, wherein the corresponding barrier pattern can be structured so that it can receive enhanced video information relating to an image of the 3-D scene (e.g., enhanced 2-D content of an image of the 3-D scene) based at least in part on the respective subsets of visual information for the synthesized 3-D scene, can process the enhanced video information to identify the respective 2-D images of the respective subsets of visual information, and can direct the respective 2-D images to proceed in respective directions that correspond to the respective positions associated with the respective subsets of visual information for the respective perspectives of the synthesized 3-D scene, so that the reconstructed synthesized 3-D scene can be the same or substantially similar to the synthesized 3-D scene as generated, when the reconstructed synthesized 3-D scene is presented by the barrier component to the viewer.

In an aspect, the respective scene capture devices 402 through 414 can collect or capture respective subsets of visual information relating to the real 3-D scene to facilitate recreating the real 3-D scene later for a viewer. The scene capture devices 402 through 414 can be associated (e.g., communicatively connected via a wired or wireless communication connection) with the capture component 302 of FIG. 3, and the capture component 302 can receive the respective subsets of video information relating to the real 3-D scene from the respective scene capture devices 402 through 414.

In another aspect, the system 300 can include a render component 304 that can receive the respective subsets of visual information of a 3-D scene (e.g., real or synthesized) and can render or generate enhanced 2-D video content, based at least in part on the respective subsets of visual information. For each 2-D image of the enhanced 2-D video content, such 2-D image can comprise visual information for all of the different positions or perspectives of the 3-D scene, wherein the barrier component, employing the appropriate barrier pattern in accordance with the appropriate barrier pattern mode, can use the visual information to reconstruct all of the 2-D images from the various different visual perspectives to reconstruct the 3-D image based at least in part on the various reconstructed 2-D images of the different visual perspectives. The enhanced 2-D video content and/or the captured or generated visual information can be stored in the data store 308.

The system 300 also can comprise a processor component 306 that can work in conjunction with the other components (e.g., capture component 302, render component 304, etc.) to facilitate performing the various functions of the system 300. The processor component 306 can employ one or more processors, microprocessors, or controllers that can process data, such as information (e.g., visual information) relating to a real or synthesized 3-D scene, data relating to parameters associated with the system 300 and associated components, etc., to facilitate capturing, generating, synthesizing, and rendering visual information relating to or representative of a 3-D scene; and can control data flow between the system 300 and other components associated with the system 300 and data flow between the various components of the system 300.

In yet another aspect, the system 300 can contain a data store 308 that can store data structures (e.g., user data, metadata); code structure(s) (e.g., modules, objects, classes, procedures), commands, or instructions; information, such as visual information, relating to (e.g., representative of) a 3-D scene; render data; and so on. In an aspect, the processor component 306 can be functionally coupled (e.g., through a memory bus) to the data store 308 in order to store and retrieve information desired to operate and/or confer functionality, at least in part, to the capture component 302, render component 304, and/or substantially any other operational aspects of the system 300. It is to be appreciated and understood that the various components of the system 300 can communicate information between each other and/or between other components associated with the system 300 as desired to carry out operations of the system 300. It is to be further appreciated and understood that the capture component 302, render component 304, processor component 306, and data store 308 each can be a stand-alone unit, can be included within the system 300 (as depicted), can be incorporated within another component, and/or virtually any suitable combination thereof, as desired.

Figure 5:
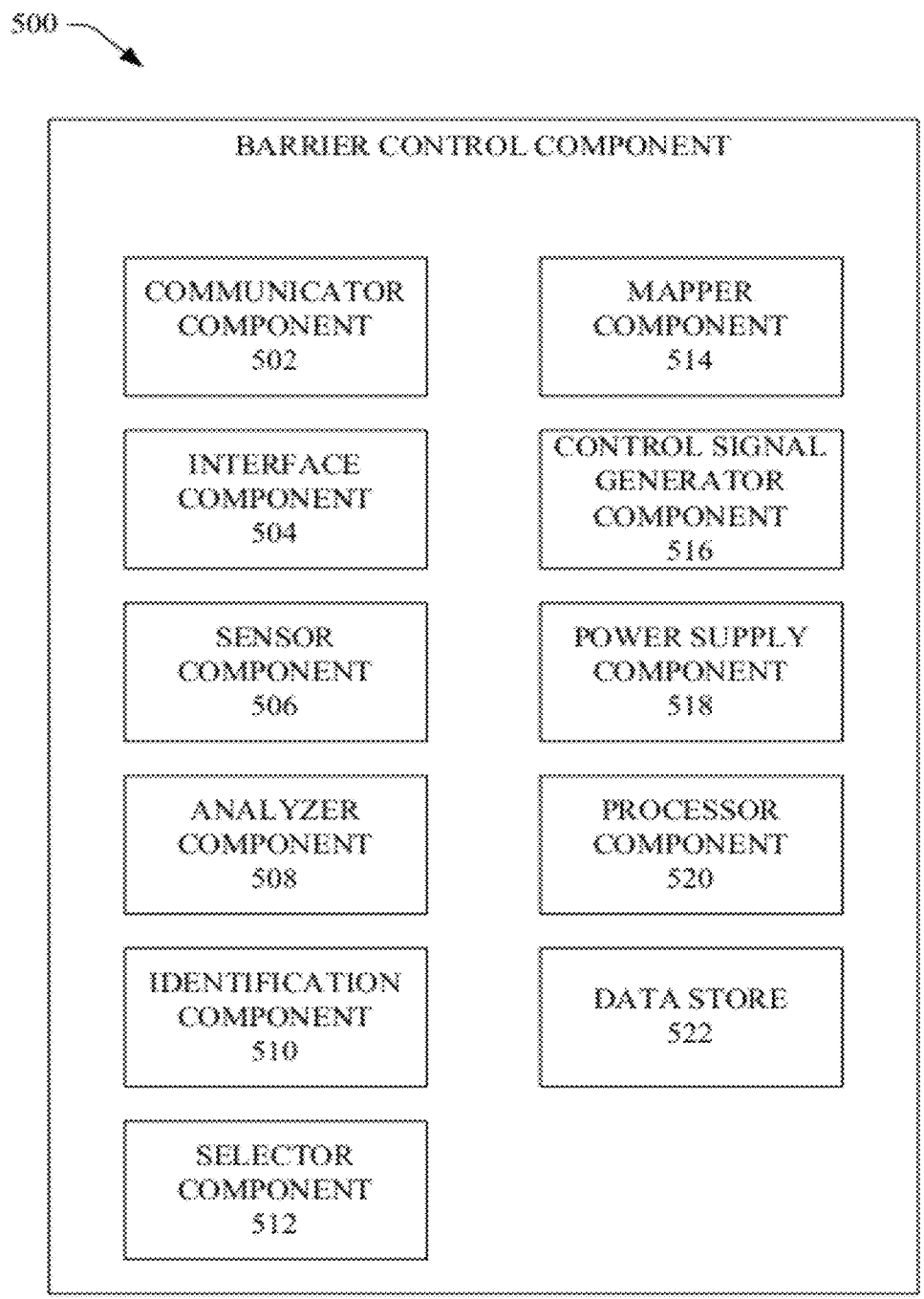
FIG. 5 depicts a block diagram of an example barrier control component in accordance with various aspects and embodiments of the disclosed subject matter.

FIG. 5 illustrates a block diagram of an example barrier control component 500 in accordance with various aspects and embodiments of the disclosed subject matter. In an aspect, the barrier control component 500 can include a communicator component 502 that can facilitate communication (e.g., transmission, reception) of information between components within the barrier control component 500 or communication between the barrier control component 500 and other components (e.g., barrier component, display screen component) associated with the barrier control component 500. The communicator component 502 can communicate data via a wireline or wireless communication connection using one or more specified communication protocols and one or more types of communication technology (e.g., wireless communication technology, such as Bluetooth, cellular, Near Field Communication (NFC), etc.), for example, as are known in the art. To facilitate wireless communication of data, the communicator component 502 can comprise, for example, one or more antennas that can receive a signal(s) from and a transmit signal(s) to a wireless device (e.g., barrier component), wireless ports and routers, and so forth, that operate in a communication network (e.g., radio access network). It should be appreciated that one or more antennas can be part of communication platform, which can comprise electronic components and associated circuitry that provide for processing and manipulation of received signal(s) and signal(s) to be transmitted, e.g., receivers and transmitters, multiplexer/demultiplexer (mux/demux) component, and modulation/demodulation (mod/demod) component.

The barrier control component 500 can comprise an interface component 504 that can comprise one or more interfaces (e.g., display screens, touch screens, buttons, controls, mouse, rollerball, trackpad, voice activation, switches, adapters, connectors, speakers, etc.) that can be utilized to facilitate connection and communication with other components (e.g., barrier component) and presentation of information to a user, for example, to enable a user to update the barrier control component 500 to modify control signals, mapping information, etc. (e.g., if additional barrier patterns are added to an associated barrier component).

In another aspect, the barrier control component 500 can contain a sensor component 506 that can comprise one or more sensors (e.g., light-sensing sensors), for example, in the form of a sensor array, wherein the one or more sensors can sense or detect information, such as optical signals (e.g., light signals) transmitted or emitted from a control region of a display screen component. The barrier control component 500 also can include an analyzer component 508 that can analyze information, such as optical signals obtained from the display screen component, mapping information, or other information, to facilitate identifying a specified control signal that corresponds to a detected optical signal, wherein the specified control signal can be sent to the barrier component to control switching of the barrier component.

In another aspect, the barrier control component 500 can comprise an identification component 510 that can operate in conjunction with the analyzer component 508 to identify a specified control signal based at least in part on the detected optical signal. In still another aspect, the barrier control component 500 can include a selector component 512 that can select items, such as the identified specified control signal, for example. In yet another aspect, the barrier control component 500 can contain a mapper component 514 that can generate and/or contain a mapping of respective optical signals (or other received signals, such as audio signals) to respective control signals. The mapper component 514 can comprise a mapping of the respective optical signals and respective control signals to other items, such as respective barrier patterns, respective barrier pattern modes, respective display modes, etc.

In an aspect, the barrier control component 500 can include a control signal generator component 516 that can generate or produce one or more different types of control signals, wherein a specified control signal of the available control signals can be generated and transmitted to the barrier component to facilitate switching of the barrier component, as more fully disclosed herein. In yet another aspect, the barrier control component 500 can comprise a power supply component 518 that can employ an internal power supply to power the barrier control component 500 or can receive power from an external power supply to power the barrier control component 500.

The barrier control component 500 also can comprise a processor component 520 that can work in conjunction with the other components (e.g., communicator component 502, interface component 504, sensor component 506, etc.) to facilitate performing the various functions of the barrier control component 500. The processor component 520 can employ one or more processors, microprocessors, or controllers that can process data, such as detected signals (e.g., optical signals or patterns) relating to video content being presented by a display screen component, mapping information relating the detected signals and control signals, data relating to parameters associated with the barrier control component 500 and associated components, etc., to facilitate identifying a desired control signal to transmit to the barrier component in response to a detected signal; and can control data flow between the barrier control component 500 and other components associated with the barrier control component 500.

In yet another aspect, the barrier control component 500 can contain a data store 522 that can store data structures (e.g., user data, metadata); code structure(s) (e.g., modules, objects, classes, procedures), commands, or instructions; data, such as detected signals (e.g., optical signals or patterns) relating to video content being presented by a display screen component; control signal information; barrier pattern related information; analysis data; mapping information relating the detected signals and control signals; data relating to parameters associated with the barrier control component 500 and associated components; etc. In an aspect, the processor component 520 can be functionally coupled (e.g., through a memory bus) to the data store 522 in order to store and retrieve information desired to operate and/or confer functionality, at least in part, to the communicator component 502, interface component 504, sensor component 506, analyzer component 508, identification component 510, selector component 512, mapper component 514, control signal generator component 516, power supply component 518, and/or substantially any other operational aspects of the barrier control component 500. It is to be appreciated and understood that the various components of the barrier control component 500 can communicate information between each other and/or between other components associated with the barrier control component 500 as desired to carry out operations of the barrier control component 500. It is to be further appreciated and understood that the communicator component 502, interface component 504, sensor component 506, analyzer component 508, identification component 510, selector component 512, mapper component 514, control signal generator component 516, power supply component 518, processor component 520, and data store 522, each can be included within the barrier control component 500 (as depicted), can be a stand-alone unit, or can be incorporated within another component, and/or virtually any suitable combination thereof, as desired.

Figure 6:
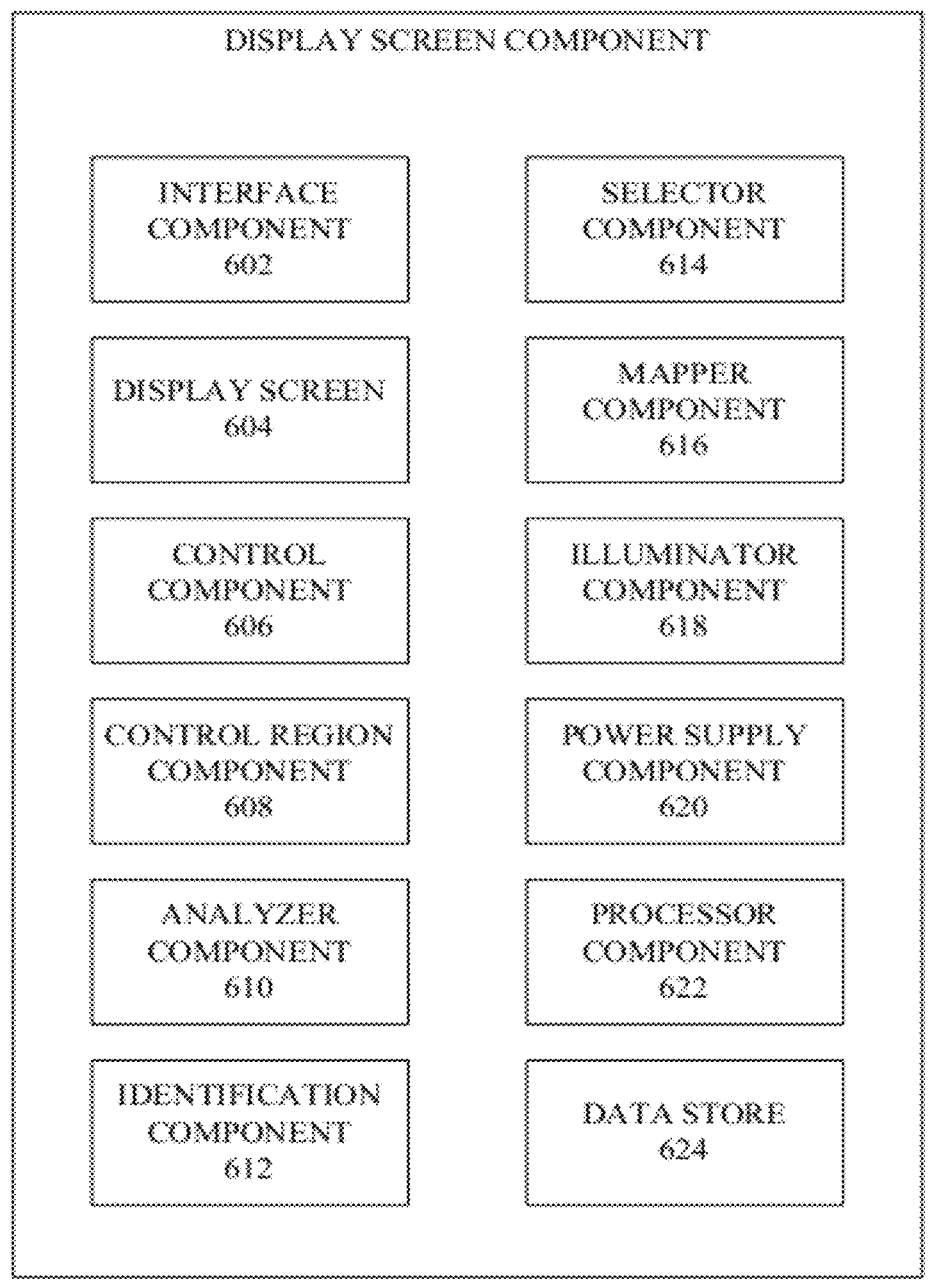
FIG. 6 illustrates a block diagram of an example display screen component in accordance with various aspects and embodiments of the disclosed subject matter.

FIG. 6 illustrates a block diagram of an example display screen component 600 in accordance with various aspects and embodiments of the disclosed subject matter. In an aspect, the display screen component 600 can comprise an interface component 602 that can present visual images and audio information to a user. The presentation component 602 can provide one or more output interfaces (e.g., display screen 604, display region on a display screen, speakers, etc.) that can present (e.g., display) information to the user. The presentation component 602 also can include input and other types of interfaces (e.g., touch screens, buttons, controls, mouse, rollerball, trackpad, voice activation, switches, adapters, connectors, etc.) to facilitate receiving information from a user as well as to enable communication and electrical connectivity by the display screen component 600 with other components. For instance, in accordance with various embodiments, the interface component 602 can display one or more parameter controls, one or more menus, a keyboard (e.g., on a touch screen display), etc., to facilitate enabling the user to adjust the presentation of video and audio content to the user. The display screen 604 can comprise a LCD, LED display, a combination LCD-LED display, a plasma display (e.g., plasma display panel (PDP)), a DLP display, a CRT display, or other type of display screen that can display visual images.

In another aspect, the display screen component 600 can include a control component 606 that can control the presentation of video and audio content, and further can control the presentation (e.g., transmission, emission) of a signal, such as an optical signal, to an associated barrier control component. At a given time when video content is being presented, the signal can be one of a plurality of available signals, wherein the signal can comprise information (e.g., specified optical pattern, bits of data having a specified data value) that can indicate, to the barrier control component, the type of video content, the desired type of barrier pattern and barrier pattern mode to be used in processing the video content for presentation to the viewer, and/or the desired control signal the barrier control component is to send to the barrier component.

The control component 606 can operate in conjunction with a control region component 608 to present the signal to the barrier control component. The control region component 608 can be employed to create a control region in the display screen 604 and video content being presented by the display screen 604, wherein the control region can have a specified size and shape, as desired. The control component 606 can embed the desired signal in the control region for presentation to the barrier control component when video content is being presented.

In accordance with various aspects, the display screen component 600 can include an analyzer component 610 that can analyze information, such as video content, information (e.g., metadata) relating to the video content, mapping information relating to the optical signals and types/modes of barrier patterns, or other information, to facilitate identifying a specified signal to present in the control region in relation to video content being presented, wherein the specified signal can be presented to the barrier control component via the control region to facilitate controlling switching of the barrier component. The display screen component 600 also can comprise an identification component 612 that can operate in conjunction with the analyzer component 610 to identify a specified signal based at least in part on the type of video content being presented. In still another aspect, the display screen component 600 can include a selector component 614 that can select items, such as the identified specified signal as well as items selected by a user via the interface component 602. In yet another aspect, the display screen component 600 can contain a mapper component 616 that can generate and/or contain a mapping of respective types of optical signals (or other signals, such as audio signals) to respective types of video content, respective types or modes of barrier patterns, respective display modes, and/or respective types of control signals.

In still another aspect, the display screen component 600 can include an illuminator component 618 that can illuminate pixels associated with the display screen 604 at respective wavelengths and illumination levels to facilitate producing and presenting the video content as well as the signal in the control region. In yet another aspect, the display screen component 600 can comprise a power supply component 620 that can employ an internal power supply to power the display screen component 600 or can receive power from an external power supply to power the display screen component 600.

The display screen component 600 also can comprise a processor component 622 that can work in conjunction with the other components (e.g., interface component 602, display screen 604, control component 606, etc.) to facilitate performing the various functions of the display screen component 600. The processor component 622 can employ one or more processors, microprocessors, or controllers that can process data, such as signals (e.g., optical signals or patterns) relating to video content being presented by a display screen component 600, video content, audio content, mapping information relating the optical signals, type of video content and/or types/modes of barrier patterns, data relating to parameters associated with the display screen component 600 and associated components, etc., to facilitate identifying a desired signal to transmit to the barrier control component in associated with video content being presented; and can control data flow between the display screen component 600 and other components associated with the display screen component 600.

In yet another aspect, the display screen component 600 can contain a data store 624 that can store data structures (e.g., user data, metadata); code structure(s) (e.g., modules, objects, classes, procedures), commands, or instructions; data, such as signals (e.g., optical signals or patterns) relating to video content being presented by a display screen component 600; signal information; barrier pattern related information; analysis data; mapping information relating the signals and type of video content; data relating to parameters associated with the display screen component 600 and associated components; etc. In an aspect, the processor component 622 can be functionally coupled (e.g., through a memory bus) to the data store 624 in order to store and retrieve information desired to operate and/or confer functionality, at least in part, to the interface component 602, display screen 604, control component 606, control region component 608, analyzer component 610, identification component 612, selector component 614, mapper component 616, illuminator component 618, power supply component 620, and/or substantially any other operational aspects of the display screen component 600. It is to be appreciated and understood that the various components of the display screen component 600 can communicate information between each other and/or between other components associated with the display screen component 600 as desired to carry out operations of the display screen component 600. It is to be further appreciated and understood that the interface component 602, display screen 604, control component 606, control region component 608, analyzer component 610, identification component 612, selector component 614, mapper component 616, illuminator component 618, power supply component 620, processor component 622, and data store 624, each can be included within the display screen component 600 (as depicted), can be a stand-alone unit, or can be incorporated within another component, and/or virtually any suitable combination thereof, as desired.

Figure 7:
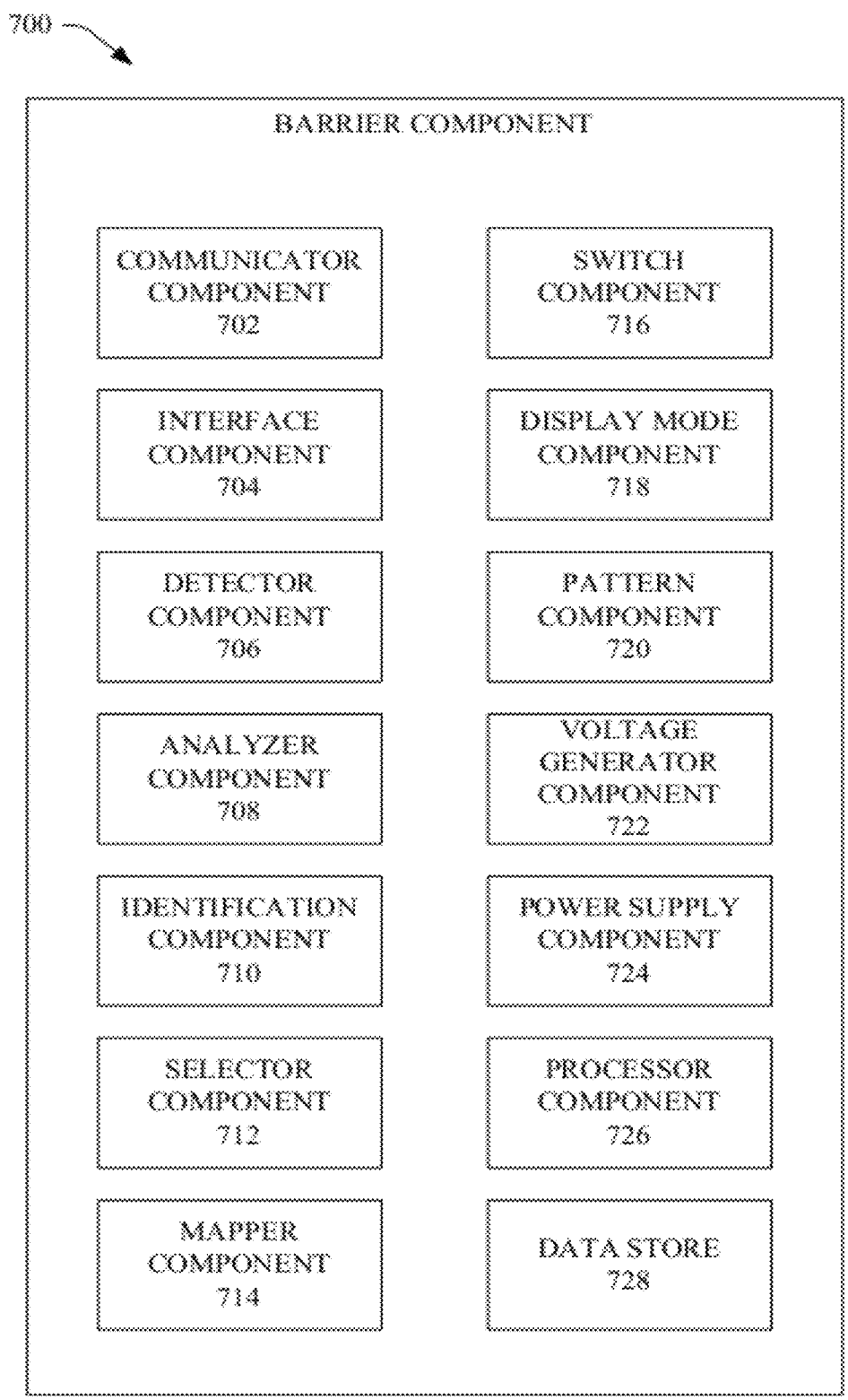
FIG. 7 illustrates a block diagram of an example barrier component in accordance with various aspects and embodiments of the disclosed subject matter.

FIG. 7 illustrates a block diagram of an example barrier component 700 in accordance with various aspects and embodiments of the disclosed subject matter. In an aspect, the barrier component 700 can include a communicator component 702 that can facilitate communication (e.g., transmission, reception) of information between components within the barrier component 700 or communication between the barrier component 700 and other components (e.g., barrier control component, display screen component) associated with the barrier component 700. The communicator component 702 can communicate data via a wireline or wireless communication connection using one or more specified communication protocols and one or more types of communication technology (e.g., wireless communication technology, such as Bluetooth, cellular, Near Field Communication (NFC), etc.), for example, as are known in the art. To facilitate wireless communication of data, the communicator component 702 can comprise, for example, one or more antennas that can receive a signal(s) from and a transmit signal(s) to a wireless device (e.g., barrier control component), wireless ports and routers, and so forth, that operate in a communication network (e.g., radio access network). It should be appreciated that one or more antennas can be part of communication platform, which can comprise electronic components and associated circuitry that provide for processing and manipulation of received signal(s) and signal(s) to be transmitted, e.g., receivers and transmitters, multiplexer/demultiplexer (mux/demux) component, and modulation/demodulation (mod/demod) component.

The barrier component 700 can comprise an interface component 704 that can comprise one or more interfaces (e.g., presentation or display screen, touch screens, buttons, controls, mouse, rollerball, trackpad, voice activation, switches, adapters, connectors, speakers, etc.) that can be utilized to facilitate connection and communication with other components (e.g., barrier control component) and presentation of information to a user, for example, to enable a user to update the barrier component 700 to modify (e.g., change, add, remove, etc.) barrier patterns, barrier pattern modes, mapping information, etc. (e.g., if additional barrier patterns are added to the barrier component 700).

In another aspect, the barrier component 700 can contain a detector component 706 that can monitor received information and can detect a control signal received from the associated barrier control component, wherein the detected control signal can be forwarded to an analyzer component 708 for further processing.

In yet another aspect, the barrier component 700 can employ the analyzer component 708 to analyze information, such as the control signal received from the barrier control component, mapping information, or other information, to facilitate identifying a specified display mode, specified barrier pattern and/or specified barrier pattern mode that correspond to the detected control signal, wherein the specified barrier pattern and specified barrier pattern mode can be utilized to process video content received from the display screen component.

In another aspect, the barrier component 700 can comprise an identification component 710 that can operate in conjunction with the analyzer component 708 to identify a specified display mode, specified barrier pattern and/or specified barrier pattern mode based at least in part on the detected control signal. In still another aspect, the barrier component 700 can include a selector component 712 that can select items, such as the identified specified display mode, specified barrier pattern and/or specified barrier pattern mode, for example. In yet another aspect, the barrier component 700 can contain a mapper component 714 that can generate and/or contain a mapping of respective control signals to other items, such as respective barrier patterns, respective barrier pattern modes, respective display modes, etc., which can be utilized to facilitate identifying a desired specified display mode, specified barrier pattern and/or specified barrier pattern mode for use in processing and presenting video content, as more fully disclosed herein.

In an aspect, the barrier component 700 can include a switch component 716 that can be used to control switching (e.g., automatically or dynamically in real time) of barrier patterns and barrier pattern modes, and/or corresponding display modes, in accordance with the detected control signal and video content being presented. The barrier component 700 can further comprise a display mode component 718 that can comprise a plurality of available display modes (e.g., normal 2-D display mode, 3-D stereoscopic display mode, 3-D autostereoscopic display mode) that can correspond to respective barrier patterns and barrier pattern modes that can be employed by the barrier component 700, as more fully disclosed herein.

In still another aspect, the barrier component 700 can contain a pattern component 720 that can comprise a plurality of barrier patterns for use in processing video content for display. One or more of the barrier patterns can comprise multiple modes, such as, for example, a transparent mode and a partially opaque mode, wherein the transparent mode can be selected when normal 2-D content is being processed and the partially opaque mode (e.g., partially opaque in the form of a repetitive pattern of columns of evenly spaced opaque vertical strips for use to process stereoscopic-type 3-D content; partially opaque in the form of a plurality of slanted opaque strips, which can be repetitive and/or regularly spaced, for use to process autostereoscopic-type 3-D content) can be selected when enhanced 2-D content is being processed to reconstruct a 3-D scene, as more fully disclosed herein.

In yet another aspect, the barrier component 700 can include a voltage generator component 722 that can be used by the switch component 716 to generate and apply a specified voltage to electrodes associated with a barrier pattern to select a desired barrier pattern mode, wherein respective applied voltages can facilitate selection of respective barrier pattern modes of a barrier pattern. In yet another aspect, the barrier component 700 can comprise a power supply component 724 that can employ an internal power supply to power the barrier component 700 or can receive power from an external power supply to power the barrier component 700.

The barrier component 700 also can comprise a processor component 726 that can work in conjunction with the other components (e.g., communicator component 702, interface component 704, detector component 706, etc.) to facilitate performing the various functions of the barrier component 700. The processor component 726 can employ one or more processors, microprocessors, or controllers that can process data, including control signals relating to video content being presented by a display screen component, video content, audio content, mapping information relating the control signals, type of video content and/or types/modes of barrier patterns, data relating to parameters associated with the barrier component 700 and associated components, etc., to facilitate identifying a desired display mode, barrier pattern and/or barrier pattern mode to employ in relation to processing video content received from the display screen component; and can control data flow between the barrier component 700 and other components associated with the barrier component 700.

In yet another aspect, the barrier component 700 can contain a data store 728 that can store data structures (e.g., user data, metadata); code structure(s) (e.g., modules, objects, classes, procedures), commands, or instructions; data, including control signals relating to video content being presented by a display screen component 600, video content, audio content, signal information, barrier pattern related information, analysis data, mapping information relating the signals and type of video content, data relating to parameters associated with the barrier component 700 and associated components; etc. In an aspect, the processor component 726 can be functionally coupled (e.g., through a memory bus) to the data store 728 in order to store and retrieve information desired to operate and/or confer functionality, at least in part, to the communicator component 702, interface component 704, detector component 706, analyzer component 708, identification component 710, selector component 712, mapper component 714, switch component 716, display mode component 718, pattern component 720, voltage generator component 722, power supply component 724, and/or substantially any other operational aspects of the barrier component 700. It is to be appreciated and understood that the various components of the barrier component 700 can communicate information between each other and/or between other components associated with the barrier component 700 as desired to carry out operations of the barrier component 700. It is to be further appreciated and understood that the communicator component 702, interface component 704, detector component 706, analyzer component 708, identification component 710, selector component 712, mapper component 714, switch component 716, display mode component 718, pattern component 720, voltage generator component 722, power supply component 724, processor component 726, and data store 728, each can be included within the barrier component 700 (as depicted), can be a stand-alone unit, or can be incorporated within another component, and/or virtually any suitable combination thereof, as desired.

In accordance with another embodiment of the disclosed subject matter, one or more components (e.g., barrier control component, display screen component, barrier component, etc.) can utilize artificial intelligence (AI) techniques or methods to infer (e.g., reason and draw a conclusion based at least in part on a set of metrics, arguments, or known outcomes in controlled scenarios) an automated response to perform in response to an inference(s); type of video content being presented; a barrier pattern and/or barrier pattern mode to use for processing video content; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the systems and methods disclosed herein to facilitate rendering an inference(s) related to the systems and methods disclosed herein.

In particular, the one or more components in the communication network environment can employ one of numerous methods for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing techniques or methods can be applied to analysis of the historic and/or current data associated with systems and methods disclosed herein to facilitate making inferences or determinations related to systems and methods disclosed herein.

In accordance with one embodiment of the disclosed subject matter, one or more of the systems, the devices, the barrier control component, and/or other components disclosed herein, can be or can comprise one or more electronic circuits situated or implemented on a single integrated-circuit chip. In accordance with another embodiment, one or more of the systems, the devices, the barrier control component, and/or other components disclosed herein, can be or can comprise one or more electronic circuits implemented on an application-specific integrated-circuit (ASIC) chip. In yet another embodiment, one or more of the systems, the devices, the barrier control component, and/or other components disclosed herein, can be or can comprise one or more electronic circuits situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 8-11 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Figure 8:
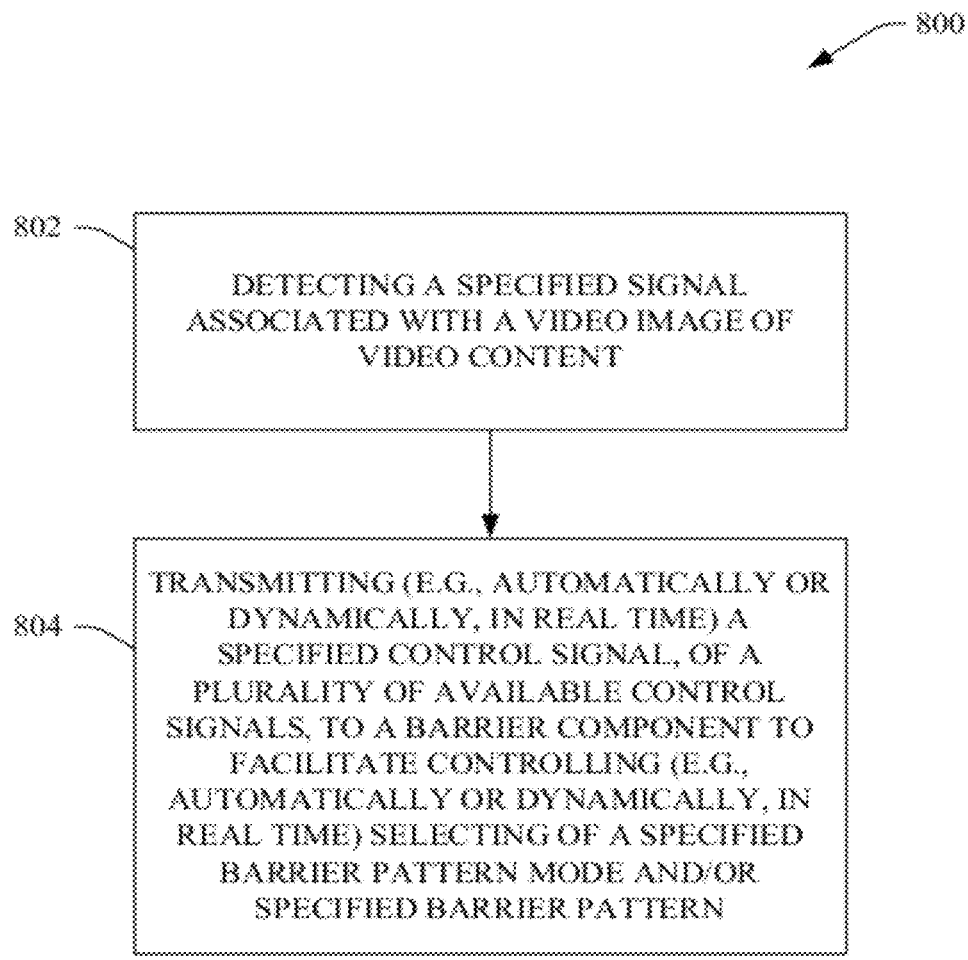
FIG. 8 depicts a flow diagram of an example method that can control (e.g., automatically or dynamically, in real time) switching or selecting of a particular display mode of a plurality of available display modes of a barrier component in accordance with various embodiments and aspects of the disclosed subject matter.

Referring to FIG. 8, a flow diagram of an example method 800 that can control (e.g., automatically or dynamically, in real time) switching or selecting of a particular display mode of a plurality of available display modes of a barrier component in accordance with various embodiments and aspects of the disclosed subject matter is illustrated. At 802, a specified signal associated with a video image of video content can be detected. For example, the barrier control component can monitor or scan a control region of a display screen and/or the video image (e.g., 2-D video image) displayed in the display screen, and can detect the specified signal (e.g., specified optical signal), wherein the specified signal can be one of a plurality of available signals that can be respectively associated with corresponding display modes and/or corresponding barrier pattern modes or barrier patterns associated with the barrier component.

At 804, a specified control signal, of a plurality of available control signals, can be transmitted (e.g., automatically or dynamically, in real time) to a barrier component to facilitate controlling (e.g., automatically or dynamically, in real time) selecting of or switching to a specified barrier pattern mode (and/or specified barrier pattern) by the barrier component, wherein the specified control signal can be based at least in part on the detected specified signal. For instance, the specified control signal can facilitate controlling selection of a specified barrier pattern mode and a specified barrier pattern, which are most suitable for processing the video image, from a plurality of available barrier pattern modes and a plurality of available barrier patterns. The respective control signals of the plurality of available control signals can be associated with corresponding display modes and/or corresponding barrier pattern mode (and/or specified barrier pattern) associated with the barrier component. The barrier control component can identify and select the specified control signal from the plurality of available control signals, based at least in part on the identity (e.g., data value) of the detected specified signal.

Figure 9:
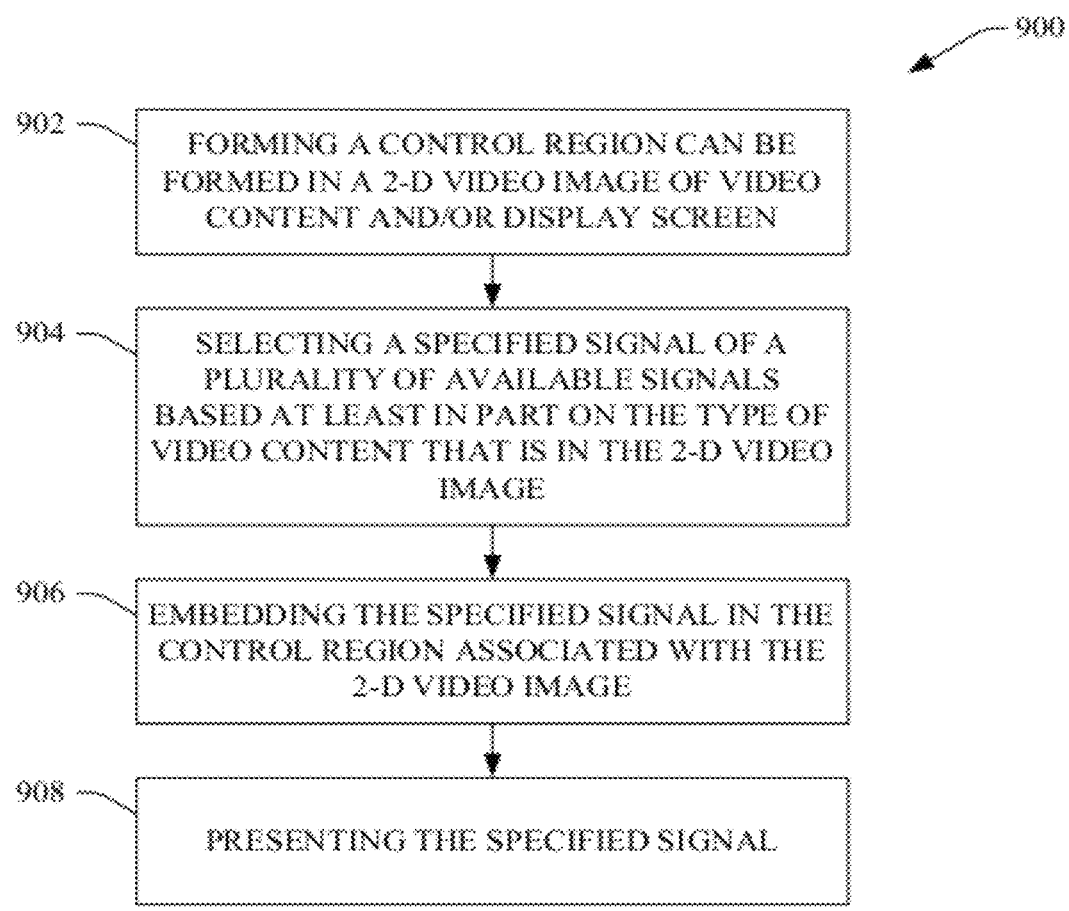
FIG. 9 illustrates a flow diagram of an example method can present a specified signal of a plurality of available signals (e.g., optical signals) to facilitate controlling (e.g., automatically or dynamically, in real time) switching or selecting of a particular display mode of a plurality of available display modes of a barrier component in accordance with various embodiments and aspects of the disclosed subject matter.

Turning to FIG. 9, illustrated is a flow diagram of an example method 900 can present a specified signal of a plurality of available signals (e.g., optical signals) to facilitate controlling (e.g., automatically or dynamically, in real time) switching or selecting of a particular display mode of a plurality of available display modes of a barrier component in accordance with various embodiments and aspects of the disclosed subject matter. At 902, a control region can be formed in a 2-D video image of video content (and/or display screen). The control region can be sized (e.g., in terms of physical size, the number of pixels, and/or the number of data bits that can be contained within the control region) and shaped (e.g., square, circle, oval, rectangle, etc.) as desired so that it can contain information, such as a control signal, therein.

At 904, a specified signal of a plurality of available signals can be selected (or generated) based at least in part on the type of video content that is in the 2-D video image. For example, a first signal can be selected when the 2-D video image contains 2-D video content, a second signal can be selected when the 2-D video image is enhanced and contains multiple images (e.g., two images) that form 3-D stereoscopic video content, or a third signal can be selected when the 2-D video image is enhanced and contains multiple images (e.g., three or more images) that form 3-D autostereoscopic video content.

At 906, the specified signal can be embedded in the control region associated with the 2-D video image. At 908, the specified signal can be presented. In an aspect, the display screen component can present (e.g., display) the 2-D video image and the specified signal embedded in the control region. The barrier control component can detect the presented specified signal, wherein the specified signal can be utilized by the barrier control component to facilitate automatically generating and transmitting a corresponding control signal to the barrier component to facilitate controlling selecting or switching of barrier pattern mode (and/or specified barrier pattern) in real time to desirably display video content, as more fully disclosed herein.

Figure 10:
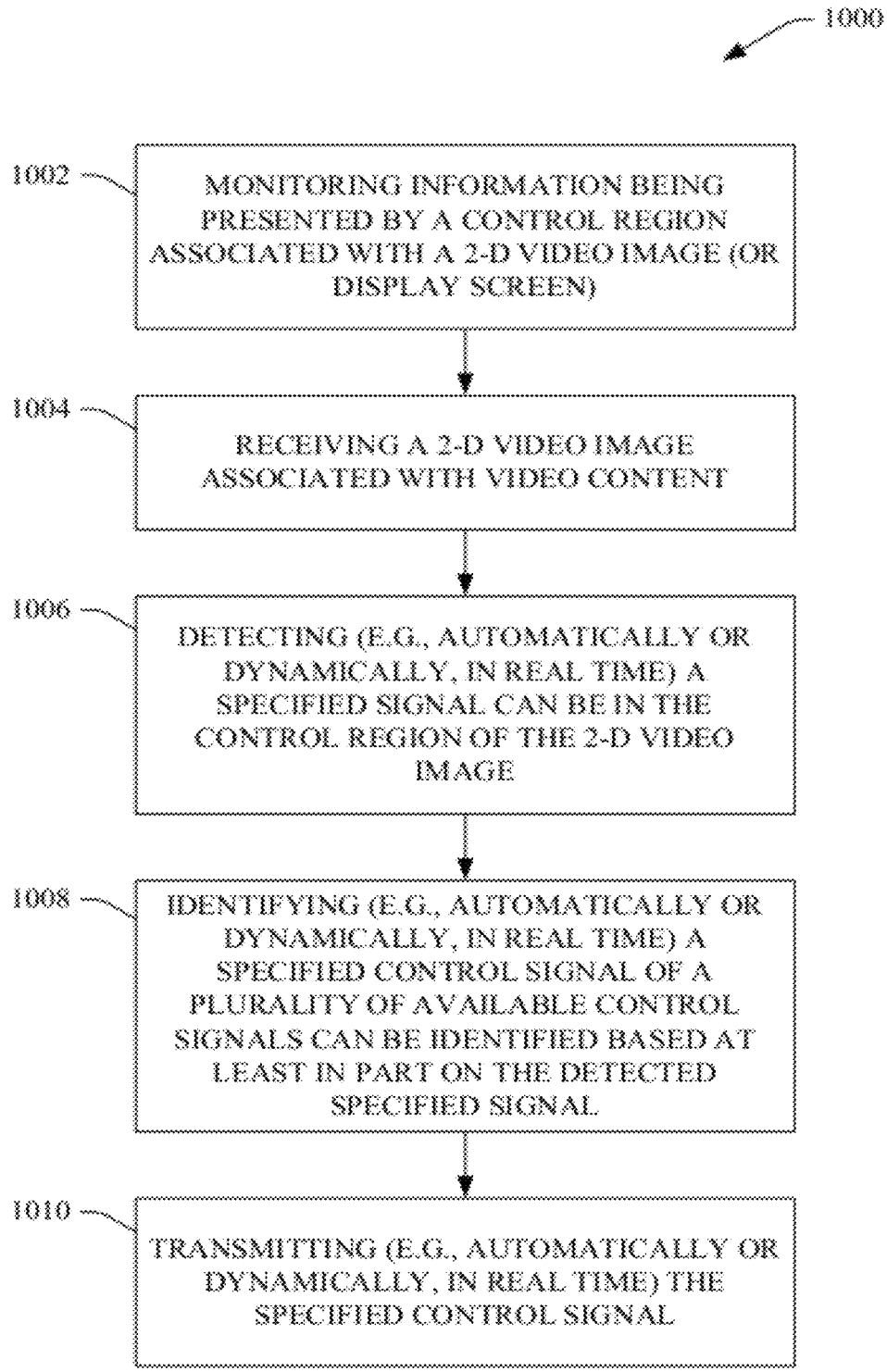
FIG. 10 depicts a flow diagram of an example method that can generate a control signal to facilitate controlling (e.g., automatically or dynamically, in real time) switching or selecting of a particular display mode of a plurality of available display modes of a barrier component in accordance with various embodiments and aspects of the disclosed subject matter.

FIG. 10 depicts a flow diagram of an example method 1000 that can generate a control signal to facilitate controlling (e.g., automatically or dynamically, in real time) switching or selecting of a particular display mode of a plurality of available display modes of a barrier component in accordance with various embodiments and aspects of the disclosed subject matter. At 1002, information being presented by a control region associated with a 2-D video image (or display screen) can be monitored. At 1004, a 2-D video image associated with video content can be received. The 2-D video image can comprise a control region that can contain a specified signal of a plurality of available signals (e.g., optical signals), such as more fully disclosed herein. At 1006, a specified signal can be detected (e.g., automatically or dynamically, in real time) in the control region of the 2-D video image. In an aspect, the barrier control component can monitor or scan the control region and can detect or sense the specified signal embedded in the control region of the 2-D video image.

At 1008, a specified control signal of a plurality of available control signals can be identified (and selected) (e.g., automatically or dynamically, in real time) based at least in part on the detected specified signal. In an aspect, the barrier control component can identify and select the specified control signal, which can correspond (e.g., and be mapped) to the detected specified signal and also correspond (e.g., and be mapped) to a specified barrier pattern mode (and/or specified barrier pattern) of a plurality of available barrier pattern mode (and/or available barrier pattern), wherein the specified barrier pattern mode (and/or specified barrier pattern) can be the desired (e.g., appropriate) barrier pattern mode (and/or barrier pattern) to use to process the 2-D video image for presentation to a viewer so that the quality of the image and visual characteristics (e.g., 3-D visual effects) are as desired (e.g., are at optimal visual quality).

At 1010, the specified control signal can be transmitted (e.g., automatically or dynamically, in real time), for example, to the barrier component. In an aspect, the barrier control component can transmit (e.g., communicate) the specified control signal to the barrier component, wherein the barrier component can receive the specified control signal, and can select and implement a barrier pattern (in a corresponding barrier pattern mode) corresponding to the specified control signal, wherein the corresponding barrier pattern can be used to process the 2-D video image to generate and present the processed video image (e.g., 2-D video image, 3-D stereoscopic video image, 3-D autostereoscopic video image) to the viewer, as more fully disclosed herein.

Figure 11:
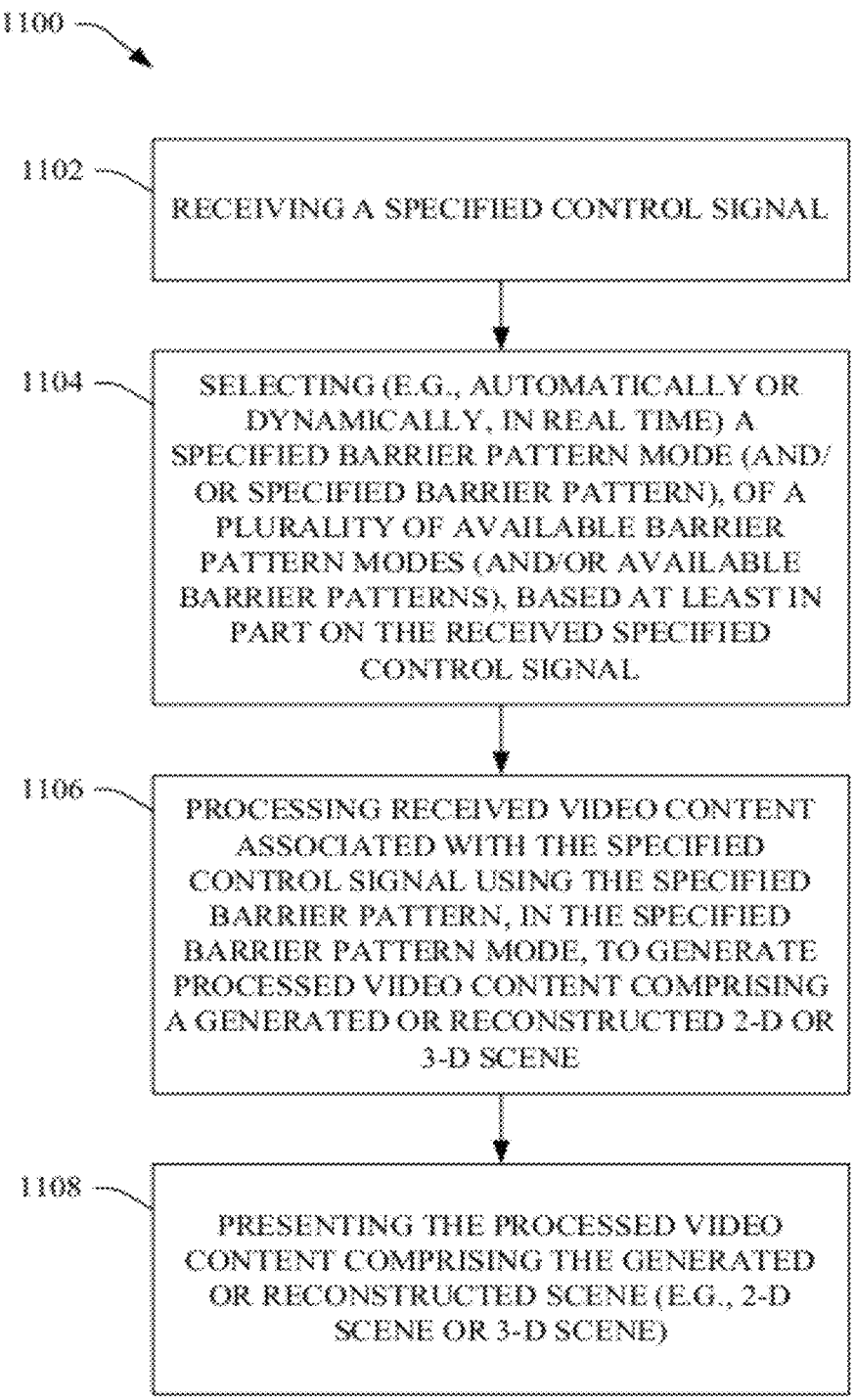
FIG. 11 illustrates a flow diagram of an example method that can utilize a received control signal to facilitate controlling (e.g., automatically or dynamically, in real time) switching or selecting of a particular display mode of a plurality of available display modes of a barrier component in accordance with various embodiments and aspects of the disclosed subject matter.

FIG. 11 illustrates a flow diagram of an example method 1100 that can utilize a received control signal to facilitate controlling (e.g., automatically or dynamically, in real time) switching or selecting of a particular display mode of a plurality of available display modes of a barrier component in accordance with various embodiments and aspects of the disclosed subject matter.

At 1102, a specified control signal can be received. In an aspect, the barrier component can receive the specified control signal from the barrier control component in relation to controlling switching or selecting a barrier pattern mode (and/or barrier pattern) corresponding to the specified control signal to facilitate processing video content being presented by the barrier component to the viewer.

At 1104, a specified barrier pattern mode (and/or specified barrier pattern), of a plurality of available barrier pattern modes (and/or available barrier patterns), can be selected (e.g., automatically or dynamically, in real time) based at least in part on the received specified control signal. In an aspect, the barrier component can analyze the specified control signal, and based at least in part on the information in the specified control signal, the barrier component can identify and select the specified barrier pattern mode (and/or specified barrier pattern) that corresponds with the information in the specified control signal. For example, the barrier component can contain respective mappings of available control signals to available barrier pattern modes (and/or available barrier patterns), and can identify and select the specified barrier pattern mode (and/or specified barrier pattern) that is mapped to the specified control signal.

At 1106, received video content associated with the specified control signal can be processed using the specified barrier pattern, in the specified barrier pattern mode, to generate processed video content comprising a generated or reconstructed 2-D or 3-D scene. For example, 2-D video content can be processed using a transparent barrier pattern (e.g., barrier pattern in transparent barrier pattern mode) that will pass the video content through without affecting or altering the video content. As another example, enhanced 2-D video content, which can be used to reconstruct a 3-D scene, can be processed using an applicable 3-D type barrier pattern (e.g., barrier pattern for 3-D stereoscopic video content, barrier pattern for 3-D autostereoscopic video content) while in the specified barrier pattern mode, as more fully disclosed herein, to generate or reconstruct 3-D video content of a 3-D scene.

At 1108, processed video content comprising the generated or reconstructed scene (e.g., 2-D scene or 3-D scene) can be presented. For example, the barrier component can present the processed video content comprising the generated or reconstructed scene as an output, which can be viewed by a viewer.

Figure 12:
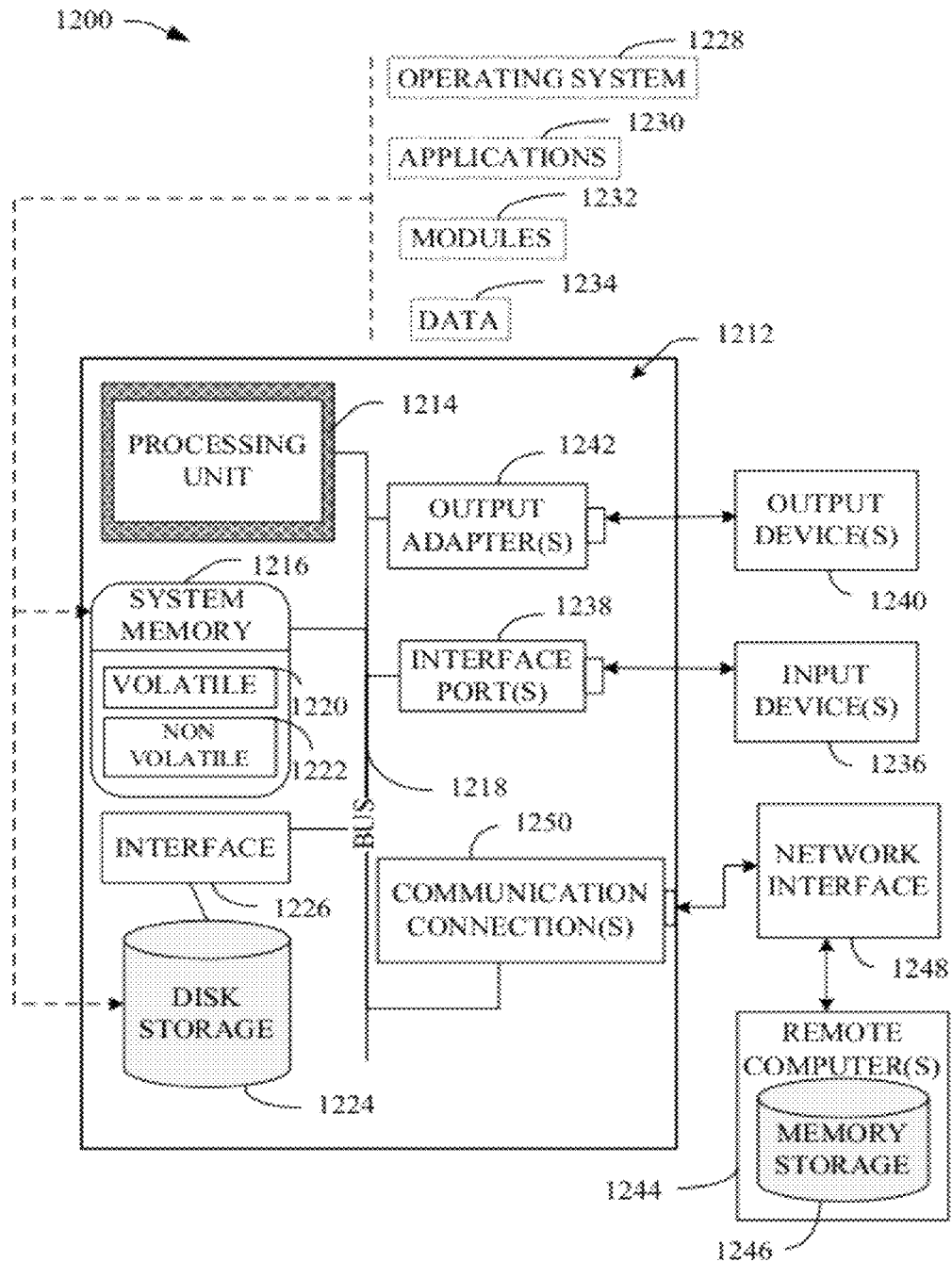
FIG. 12 is a schematic block diagram illustrating a suitable operating environment.
Figure 13:
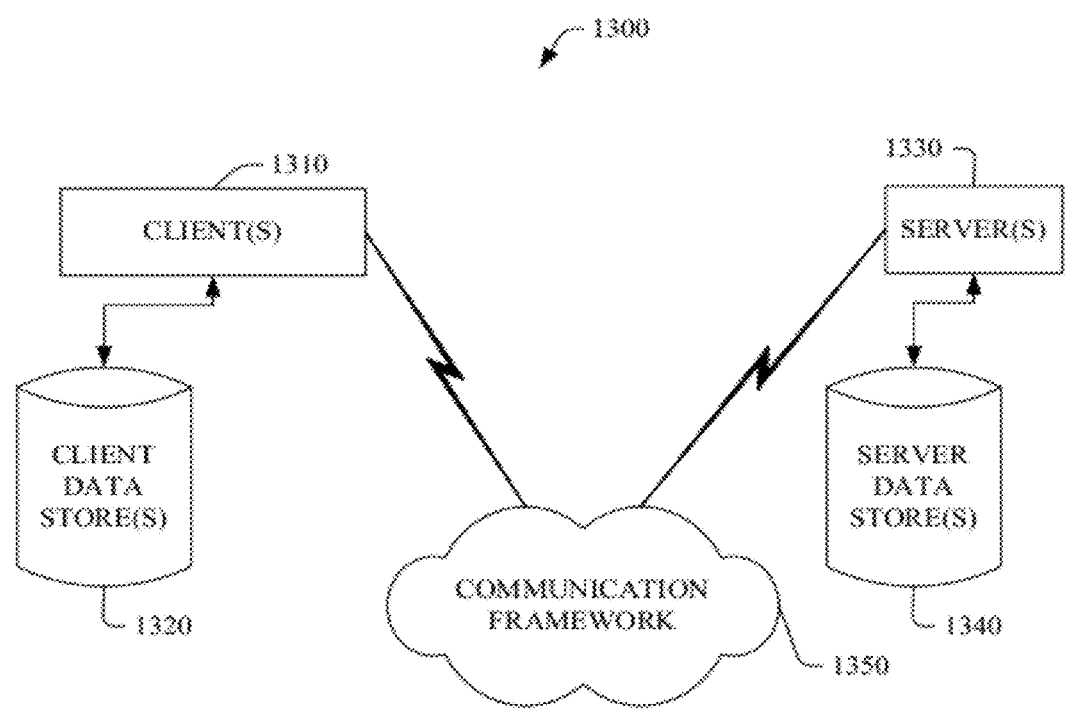
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 12, a suitable environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example, a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used, such as interface 1226).

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample-computing environment 1300 with which the subject disclosure can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the subject disclosure, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1320 that can be employed to store information local to the client(s) 1310. Similarly, the server(s) 1330 are operatively connected to one or more server data store(s) 1340 that can be employed to store information local to the servers 1330.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
a barrier control component configured to generate a control signal, based at least in part on a signal sensed from a portion of a visual image of video content presented as a visual output in a control region of a display screen of a display screen component that presents the video content, and transmit the control signal to a barrier component associated with the display screen to facilitate control of selection of a barrier pattern and a barrier pattern mode that correspond to the control signal and a video content type of the video content being presented, wherein the signal comprises an optical pattern comprising a first optical portion and a second optical portion that represent multiple bits of data having a data value that corresponds to the control signal and indicates the video content type of the video content and the barrier pattern and the barrier pattern mode to use to process the video content; and a sensor component configured to monitor the control region of the display screen and sense the signal emitted from the control region, wherein the sensor component is further configured to comprise a sensor that faces and is aligned with the control region of the display screen to facilitate the sensing of the signal emitted from the control region, wherein the sensor comprises a light sensor, wherein the sensor component is further configured to comprise a set of light sensors comprising the light sensor and at least one other light sensor, and wherein a number of light sensors in the set of light sensors is same as a number of bits of data in the multiple bits of data associated with the signal.

2. The system of claim 1, wherein the display screen component is configured to analyze the visual image to identify the video content type of the video content and generate the signal that is presented in the control region of the display screen to the sensor component.

3. The system of claim 1, wherein the barrier control component is further configured to analyze the optical pattern, determine the data value based at least in part on a result of the analysis of the optical pattern, and determine the control signal from a set of available control signals based at least in part on the data value.

4. The system of claim 1, wherein the barrier control component is further configured to determine the control signal by an analysis of a mapping of respective optical signals to respective control signals, wherein the signal is an optical signal that is mapped to the control signal.

5. The system of claim 1, wherein the barrier pattern is a first barrier pattern of a set of available barrier patterns, and the barrier pattern mode is a first barrier pattern mode of a set of available barrier pattern modes.

6. The system of claim 5, wherein the video content type of the video content is two-dimensional video content, wherein the first barrier pattern mode is a transparent barrier pattern mode of the first barrier pattern, wherein the transparent pattern mode causes the first barrier pattern to be transparent to allow the two-dimensional video content to pass through without the two-dimensional video content being altered by the first barrier pattern, and the two-dimensional video content is output from the first barrier pattern and presented to be viewed.

7. The system of claim 5, wherein the video content type of the video content is a first type of enhanced two-dimensional video content comprising multiple respective two-dimensional views that are combined to produce a reconstructed three-dimensional scene, wherein the first barrier pattern mode is at least one of a partially opaque stereoscopic-type barrier pattern mode of the first barrier pattern or a partially opaque autostereoscopic-type barrier pattern mode of the first barrier pattern, wherein the at least one of the partially opaque stereoscopic-type barrier pattern mode or the partially opaque autostereoscopic-type barrier pattern mode causes the first barrier pattern to be partially opaque wherein, in response to the enhanced two-dimensional video content being received by the first barrier pattern, the first barrier pattern directs respective illuminating pixels along respective directions corresponding to the respective two-dimensional views of the reconstructed three-dimensional scene represented by the respective two-dimensional views, and the reconstructed three-dimensional scene is output from the first barrier pattern and presented to be viewed.

8. The system of claim 7, wherein the enhanced two-dimensional video content comprises stereoscopic content that has two two-dimensional views of each scene portion of a three-dimensional scene being reconstructed to form the reconstructed three-dimensional scene, and wherein the first barrier pattern comprises a series of repeated columns of evenly spaced vertical opaque strips with a transparent space between adjacent vertical opaque strips.

9. The system of claim 7, wherein the enhanced two-dimensional video content comprises autostereoscopic content that has more than two two-dimensional views of each scene portion of a three-dimensional scene being reconstructed to form the reconstructed three-dimensional scene, and wherein the first barrier pattern comprises a set of slanted opaque strips that are repetitive or regularly spaced with a transparent space between adjacent slanted opaque strips.

10. The system of claim 1, wherein the barrier component is further configured to receive the control signal and select in real time at least one of the barrier pattern mode or the barrier pattern, based at least in part on the control signal, and wherein the barrier component is further configured to be aligned in relation to the display screen component to facilitate reception of the video content by the barrier component.

11. The system of claim 10, wherein the barrier component is further configured to analyze the control signal and determine at least one of the barrier pattern mode or the barrier pattern that corresponds to the control signal.

12. The system of claim 11, wherein the barrier component is further configured to determine at least one of the barrier pattern mode or the barrier pattern via an analysis of a mapping of respective control signals to respective barrier pattern modes or respective barrier patterns, wherein the control signal is mapped to at least one of the barrier pattern mode or the barrier pattern.

13. The system of claim 10, wherein the barrier component is further configured to control an amount of voltage applied to the barrier pattern to control selection of the barrier pattern mode in response to the control signal.

14. The system of claim 10, wherein the barrier component is an active parallax barrier.

15. The system of claim 1, wherein the video content comprises a set of visual images comprising the visual image, a second visual image that is presented after the visual image, and a third visual image that is presented after the second visual image, wherein the signal is presented in the control region in conjunction with presentation of the visual image on the display screen, no signal is presented in the control region in conjunction with presentation of the second visual image, and a different signal is presented in conjunction with presentation of the third visual image, wherein the barrier control component generates the control signal in response to the signal, maintains the control signal in response to the no signal in the control region in conjunction with the presentation of the second visual image, and generates a different control signal in response to the different signal in conjunction with the presentation of the third visual image.

16. The system of claim 15, wherein the display screen is configured to be a two-dimensional display screen, wherein the control region is formed in a portion of the two-dimensional display screen, and wherein the two-dimensional display screen is a liquid crystal display (LCD), a light emitting diode (LED) display, a combination LCD-LED display, a plasma display, a plasma display panel (PDP), a digital light processing (DLP) display, or a cathode ray tube (CRT) display.

17. A method, comprising:
detecting, by a system comprising a processor, a specified signal, which is embedded in a video image that is part of video content, and is presented as a visual output from a control region of the video image displayed on a display screen associated with a barrier component, wherein the specified signal comprises an optical pattern comprising a first optical element and a second optical element that represent multiple bits of data having a data value that corresponds to a specified control signal and indicates a video content type of the video content, and a set of light sensors is aligned with the control region of the display screen to facilitate the detecting of the specified signal presented as the visual output from the control region, wherein the set of light sensors comprises a light sensor and at least one other light sensor, and wherein a number of light sensors in the set of light sensors is same as a number of bits of data in the multiple bits of data associated with the specified signal;
determining, by the system, the specified control signal, of a set of available control signals, based at least in part on the information that indicates the video content type of the video content; and
transmitting, by the system, the specified control signal to the barrier component to facilitate controlling selecting a specified barrier pattern mode and a specified barrier pattern for processing the video image from a set of available barrier pattern modes and a set of available barrier patterns, wherein the specified barrier pattern mode and the specified barrier pattern correspond to the video content type of the video content.

18. The method of claim 17, further comprising:
forming, by the system, the control region in the video image;
selecting, by the system, the specified signal from a set of available signals based at least in part on the video content type of the video content, wherein the video content type of the video content comprises one of two-dimensional video content, enhanced two-dimensional video content comprising stereoscopic video content, or enhanced two-dimensional video content comprising autostereoscopic video content;
embedding, by the system, the specified signal in a portion of the video image that corresponds with a location of the control region; and
displaying, by the system, the specified signal in the control region of the display screen.

19. The method of claim 17, further comprising:
monitoring, by the system, information being presented by the control region; and
receiving, by the system, the video image associated with video content, wherein the specified signal is detected from the control region in real time, and wherein the specified control signal is determined from the set of available control signals in real time based at least in part on analyzing the specified signal.

20. The method of claim 17, further comprising:
mapping, by the system, respective signals of a set of available signals to respective control signals of the set of available control signals, wherein each of the respective control signals corresponds to a respective barrier pattern mode of the set of available barrier pattern modes or a respective barrier pattern of the set of available barrier patterns; and analyzing, by the system, the specified signal and the mapping of the respective signals of the set of available signals to the respective control signals of the set of control signals to facilitate the determining of the specified control signal.

21. The method of claim 17, further comprising:
receiving, by the system, the specified control signal;
selecting, by the system, at least one of the specified barrier pattern mode or the specified barrier pattern, based at least in part on the specified control signal; and
processing, by the system, the video image using the specified barrier pattern in the specified barrier pattern mode to generate processed video content comprising a two-dimensional scene or a reconstructed three-dimensional scene depending in part on the video content type of the video content of the video image, wherein the type of video content is one of normal two-dimensional video content, enhanced two-dimensional video content comprising stereoscopic video content, or enhanced two-dimensional video content comprising autostereoscopic video content; and presenting, by the system, the processed video content.

22. The method of claim 21, further comprising:
selecting, by the system, the at least one of the specified barrier pattern mode or the specified barrier pattern in response to the video content type of the video content of the video image being determined to be normal two-dimensional video content, wherein the specified barrier pattern mode is a transparent barrier pattern mode that causes the specified barrier pattern to be transparent to allow the video image to pass through the specified barrier pattern without the video image being altered by the specified barrier pattern; and
presenting, by the system, the video image, which is two-dimensional video content, as an output from the specified barrier pattern to facilitate viewing of the video image.

23. The method of claim 21, further comprising:
selecting, by the system, at least one of the specified barrier pattern mode or the specified barrier pattern in response to the video content type of the video content of the video image being determined to be enhanced two-dimensional video content comprising stereoscopic video content comprising two respective two-dimensional views of a three-dimensional scene associated with the video image, wherein the specified barrier pattern mode is a stereoscopic-type barrier pattern mode that causes the specified barrier pattern to be a stereoscopic-type barrier pattern, wherein the stereoscopic-type barrier pattern is a partially opaque barrier pattern comprising a series of repeated columns of evenly spaced vertical opaque strips with a transparent space in between adjacent vertical opaque strips;
directing, by the system, respective illuminating pixels associated with the enhanced two-dimensional video content of the video image along respective directions corresponding to the respective two-dimensional views of the reconstructed three-dimensional scene that the respective two-dimensional views represent; and
presenting, by the system, the processed video content comprising the reconstructed three-dimensional scene as an output from the specified barrier pattern to facilitate viewing of the processed video content.

24. The method of claim 21, further comprising:
selecting, by the system, at least one of the specified barrier pattern mode or the specified barrier pattern in response to the video content type of the video content of the video image being determined to be enhanced two-dimensional video content comprising autostereoscopic video content comprising more than two respective two-dimensional views of a three-dimensional scene associated with the video image, wherein the specified barrier pattern mode is an autostereoscopic-type barrier pattern mode that causes the specified barrier pattern to be an autostereoscopic-type barrier pattern, wherein the autostereoscopic-type barrier pattern is a partially opaque barrier pattern comprising a set of slanted opaque strips that are repetitive or regularly spaced with a transparent space in between adjacent slanted opaque strips;
directing, by the system, respective illuminating pixels associated with the enhanced two-dimensional video content of the video image along respective directions corresponding to the respective two-dimensional views of the reconstructed three-dimensional scene that the respective two-dimensional views represent; and
presenting, by the system, the processed video content comprising the reconstructed three-dimensional scene as an output from the specified barrier pattern to facilitate viewing of the processed video content.

25. The method of claim 17, further comprising:
in response to the specified control signal, controlling, by the system, an amount of voltage applied to the specified barrier pattern; and
controlling, by the system, selection of the specified barrier pattern mode based at least in part on the amount of voltage applied to the specified barrier pattern.

26. A system, comprising:
means for sensing a specified signal, which is presented by a video image that is part of video content, and is presented as a visual output from a control region of a display screen associated with a barrier component, wherein the specified signal comprises an optical pattern comprising a first optical portion and a second optical portion that represent at least two bits of data having a data value that corresponds to a specified control signal and indicates a video content type of the video content, and the means for sensing is optically connected to the control region of the display screen to facilitate sensing the specified signal presented as the visual output from the control region of the display screen, wherein the means for sensing comprises a set of light sensors comprising a light sensor and at least one other light sensor, and wherein a number of light sensors in the set of light sensors is same as a number of bits of data in the at least two bits of data associated with the specified signal; and
means for transmitting the specified control signal, of a set of available specified control signals, to the barrier component to facilitate controlling selecting a specified barrier pattern mode and a specified barrier pattern that correspond to the video content type of the video content and are determined to be suitable for processing the video image from a set of available barrier pattern modes and a set of available barrier patterns, wherein the specified control signal is selected based at least in part on the information indicating the video content type of the video content.

27. A computer readable storage device storing computer executable instructions that, in response to execution, cause a system comprising a processor to perform operations comprising:
detecting a signal, embedded in a video image of video content, and presented as a visual output from a control region of a display screen associated with a barrier component, wherein the signal comprises an optical pattern comprising a first optical region and a second optical region that represent multiple bits of data having a data value that corresponds to a control signal and indicates a video content type of the video content, wherein a set of light sensors is aligned with the control region of the display screen to facilitate the detecting of the signal presented as the visual output from the control region, wherein the set of light sensors comprises a light sensor and at least one other light sensor, and wherein a number of light sensors in the set of light sensors is same as a number of bits of data in the multiple bits of data associated with the signal;

selecting the control signal of a set of available control signals based at least in part on the information contained in the signal; and transmitting the control signal to the barrier component to facilitate selecting a specified barrier pattern mode and a specified barrier pattern that correspond to the video content type of the video content for processing the video image from a set of available barrier pattern modes and a set of available barrier patterns.

28. The computer readable storage device of claim 27, wherein the operations further comprise:

analyzing the optical pattern;

determining the data value based at least in part on a result of the analysis of the optical pattern; and determining the control signal from the set of available control signals based at least in part on the data value.

* * * * *